United States Patent
Alizadeh-Shabdiz et al.

(10) Patent No.: US 8,971,923 B2
(45) Date of Patent: Mar. 3, 2015

(54) METHODS OF AND SYSTEMS FOR MEASURING BEACON STABILITY OF WIRELESS ACCESS POINTS

(71) Applicant: Skyhook Wireless, Inc., Boston, MA (US)

(72) Inventors: Farshid Alizadeh-Shabdiz, Wayland, MA (US); Nicolas Brachet, Chestnut Hill, MA (US); Gerald Cavanaugh, Providence, RI (US); Andrei Dancus, Nashua, NH (US); Russel K. Jones, Medfield, MA (US); Christopher Steger, Boston, MA (US)

(73) Assignee: Skyhook Wireless, Inc., Boston, MA (US)

( * ) Notice: Subject to any disclaimer, the term of this patent is extended or adjusted under 35 U.S.C. 154(b) by 0 days.

(21) Appl. No.: 14/052,113

(22) Filed: Oct. 11, 2013

(65) Prior Publication Data

US 2014/0045525 A1 Feb. 13, 2014

Related U.S. Application Data

(63) Continuation of application No. 13/156,576, filed on Jun. 9, 2011, now Pat. No. 8,559,974.

(60) Provisional application No. 61/353,936, filed on Jun. 11, 2010, provisional application No. 61/440,940, filed on Feb. 9, 2011.

(51) Int. Cl.
*H04W 64/00* (2009.01)
*G01S 5/02* (2010.01)
(Continued)

(52) U.S. Cl.
CPC ............. *H04W 64/00* (2013.01); *G01S 5/0278* (2013.01); *G01S 1/024* (2013.01); *G01S 5/021* (2013.01); *H04W 24/00* (2013.01); *G01S 5/0252* (2013.01); *G01S 5/14* (2013.01)
USPC ..................... 455/456.1; 455/456.3; 342/457; 370/328

(58) Field of Classification Search
USPC ............. 455/404.1, 404.2, 456.1, 456.3, 521; 342/357.06, 420, 457; 370/328, 338
See application file for complete search history.

(56) References Cited

U.S. PATENT DOCUMENTS

| 4,415,771 A | 11/1983 | Martinez |
| 4,991,176 A | 2/1991 | Dahbura et al. |

(Continued)

FOREIGN PATENT DOCUMENTS

| WO | WO-2004036240 | 4/2004 |
| WO | WO-2006096416 A2 | 9/2006 |

(Continued)

OTHER PUBLICATIONS

Castro, "A Probabilistic Room Location Service for Wireless Networked Environments," Ubicomp 2001: Ubiquitous Computing, International Conference, Atlanta, Georgia, Sep. 30-Oct. 2, 2001, Proceedings, 10 pages.

(Continued)

*Primary Examiner* — Cong Tran
(74) *Attorney, Agent, or Firm* — Cesari and McKenna, LLP

(57) ABSTRACT

Methods of and systems for measuring beacon stability of wireless access points are provided. A method of determining a measure of likelihood that a designated wireless device exhibits at least one pathological characteristic includes determining a set of reference points associated with a designated wireless device, and retrieving attributes of the reference points, attributes associated with other wireless devices related to the designated wireless device, and/or statistical information. The statistical information includes a temporal distribution of detection of signals of reference points, a spatial distribution of the reference points, and/or a cardinality of the set or a subset of the reference points. The method further includes determining a measure of likelihood that the designated wireless device exhibits at least one pathological characteristic based on attributes of the reference points, attributes associated with the reception of signals, and/or the statistical information.

24 Claims, 27 Drawing Sheets

(51) Int. Cl.
*G01S 1/02* (2010.01)
*H04W 24/00* (2009.01)
*G01S 5/14* (2006.01)

(56) References Cited

U.S. PATENT DOCUMENTS

| | | | |
|---|---|---|---|
| 5,315,636 A | 5/1994 | Patel | |
| 5,454,720 A | 10/1995 | FitzGerald et al. | |
| 5,564,121 A | 10/1996 | Chow et al. | |
| 5,832,381 A | 11/1998 | Kauppi | |
| 5,940,825 A | 8/1999 | Castelli et al. | |
| 5,946,615 A | 8/1999 | Holmes et al. | |
| 6,134,448 A | 10/2000 | Shoji et al. | |
| 6,246,884 B1 | 6/2001 | Karmi et al. | |
| 6,249,252 B1 | 6/2001 | Dupray | |
| 6,262,741 B1 | 7/2001 | Davies | |
| 6,272,405 B1 | 8/2001 | Kubota et al. | |
| 6,393,294 B1 | 5/2002 | Perez-Breva et al. | |
| 6,438,491 B1 | 8/2002 | Farmer | |
| 6,556,943 B2 | 4/2003 | Kuwahara et al. | |
| 6,625,647 B1 | 9/2003 | Barrick, Jr. et al. | |
| 6,665,658 B1 | 12/2003 | DaCosta et al. | |
| 6,674,403 B2 | 1/2004 | Gray et al. | |
| 6,678,611 B2 | 1/2004 | Khavakh et al. | |
| 6,741,188 B1 | 5/2004 | Miller et al. | |
| 6,751,453 B2 * | 6/2004 | Schemers et al. | 455/412.1 |
| 6,757,518 B2 | 6/2004 | Spratt et al. | |
| 6,789,102 B2 | 9/2004 | Gotou et al. | |
| 6,799,049 B1 | 9/2004 | Zellner et al. | |
| 6,862,524 B1 | 3/2005 | Nagda et al. | |
| 6,888,811 B2 | 5/2005 | Eaton et al. | |
| 6,915,123 B1 | 7/2005 | Daudelin et al. | |
| 6,915,128 B1 | 7/2005 | Oh | |
| 6,930,635 B2 | 8/2005 | Vayanos et al. | |
| 6,946,950 B1 | 9/2005 | Ueno et al. | |
| 6,956,527 B2 | 10/2005 | Rogers et al. | |
| 6,978,023 B2 | 12/2005 | Dacosta | |
| 7,042,391 B2 | 5/2006 | Meunier et al. | |
| 7,046,657 B2 | 5/2006 | Harrington et al. | |
| 7,103,018 B1 * | 9/2006 | Hansen et al. | 370/328 |
| 7,120,449 B1 | 10/2006 | Muhonen et al. | |
| 7,123,928 B2 | 10/2006 | Moeglein et al. | |
| 7,149,477 B2 | 12/2006 | Ogami | |
| 7,167,715 B2 | 1/2007 | Stanforth | |
| 7,167,716 B2 | 1/2007 | Kim et al. | |
| 7,197,556 B1 | 3/2007 | Short et al. | |
| 7,206,294 B2 | 4/2007 | Garahi et al. | |
| 7,250,907 B2 | 7/2007 | Krumm et al. | |
| 7,254,405 B2 | 8/2007 | Lin et al. | |
| 7,269,427 B2 | 9/2007 | Hoctor et al. | |
| 7,271,765 B2 | 9/2007 | Stilp et al. | |
| 7,305,245 B2 | 12/2007 | Alizadeh-Shabdiz et al. | |
| 7,317,914 B2 | 1/2008 | Adya et al. | |
| 7,323,991 B1 | 1/2008 | Eckert et al. | |
| 7,333,816 B2 | 2/2008 | Filizola et al. | |
| 7,397,424 B2 | 7/2008 | Houri | |
| 7,403,762 B2 | 7/2008 | Morgan et al. | |
| 7,414,988 B2 | 8/2008 | Jones et al. | |
| 7,417,961 B2 | 8/2008 | Lau | |
| 7,433,673 B1 | 10/2008 | Everson et al. | |
| 7,433,694 B2 | 10/2008 | Morgan et al. | |
| 7,471,954 B2 | 12/2008 | Brachet et al. | |
| 7,474,897 B2 | 1/2009 | Morgan et al. | |
| 7,492,315 B2 | 2/2009 | Verechtchiagine | |
| 7,493,127 B2 | 2/2009 | Morgan et al. | |
| 7,502,620 B2 | 3/2009 | Morgan et al. | |
| 7,515,578 B2 | 4/2009 | Alizadeh-Shabdiz et al. | |
| 7,551,579 B2 | 6/2009 | Alizadeh-Shabdiz et al. | |
| 7,551,929 B2 | 6/2009 | Alizadeh-Shabdiz et al. | |
| 7,616,965 B2 | 11/2009 | Rudravaram et al. | |
| 7,636,576 B1 | 12/2009 | Pfister et al. | |
| 7,706,814 B2 | 4/2010 | Sillasto et al. | |
| 7,768,963 B2 | 8/2010 | Alizadeh-Shabdiz | |
| 7,769,396 B2 | 8/2010 | Alizadeh-Shabdiz et al. | |
| 7,800,533 B2 | 9/2010 | Harper et al. | |
| 7,818,017 B2 | 10/2010 | Alizadeh-Shabdiz et al. | |
| 7,835,754 B2 | 11/2010 | Alizadeh-Shabdiz et al. | |
| 7,856,234 B2 | 12/2010 | Alizadeh-Shabdiz et al. | |
| 7,873,368 B2 | 1/2011 | Goren | |
| 7,916,661 B2 | 3/2011 | Alizadeh-Shabdiz et al. | |
| 7,940,213 B2 | 5/2011 | Harper et al. | |
| 7,948,433 B2 | 5/2011 | Seatovic et al. | |
| 8,014,788 B2 | 9/2011 | Alizadeh-Shabdiz et al. | |
| 8,032,153 B2 * | 10/2011 | Dupray et al. | 455/456.1 |
| 8,090,386 B2 | 1/2012 | Alizadeh-Shabdiz et al. | |
| 8,106,828 B1 | 1/2012 | Do et al. | |
| 8,121,609 B2 | 2/2012 | Bosnjakovic et al. | |
| 8,130,148 B2 | 3/2012 | Alizadeh-Shabdiz | |
| 8,144,673 B2 | 3/2012 | Alizadeh-Shabdiz | |
| 8,185,129 B2 | 5/2012 | Alizadeh-Shabdiz | |
| 8,229,455 B2 | 7/2012 | Alizadeh-Shabdiz | |
| 8,244,272 B2 | 8/2012 | Morgan et al. | |
| 8,315,233 B2 | 11/2012 | Alizadeh-Shabdiz | |
| 8,340,685 B2 | 12/2012 | Cochran et al. | |
| 8,369,264 B2 | 2/2013 | Brachet et al. | |
| 8,436,769 B2 * | 5/2013 | Huang et al. | 342/357.42 |
| 8,489,732 B1 | 7/2013 | Liang et al. | |
| 2001/0022558 A1 | 9/2001 | Karr et al. | |
| 2001/0053999 A1 | 12/2001 | Feinberg | |
| 2002/0055956 A1 | 5/2002 | Krasnoiarov et al. | |
| 2002/0080063 A1 | 6/2002 | Bloebaum et al. | |
| 2002/0154056 A1 | 10/2002 | Gaal et al. | |
| 2002/0173317 A1 | 11/2002 | Nykanen et al. | |
| 2002/0184331 A1 | 12/2002 | Blight et al. | |
| 2003/0043073 A1 | 3/2003 | Gray et al. | |
| 2003/0069024 A1 | 4/2003 | Kennedy | |
| 2003/0087647 A1 | 5/2003 | Hurst | |
| 2003/0114206 A1 | 6/2003 | Timothy et al. | |
| 2003/0125045 A1 | 7/2003 | Riley et al. | |
| 2003/0146835 A1 | 8/2003 | Carter | |
| 2003/0225893 A1 | 12/2003 | Roese et al. | |
| 2004/0019679 A1 | 1/2004 | Sandhya et al. | |
| 2004/0039520 A1 | 2/2004 | Khavakh et al. | |
| 2004/0058640 A1 | 3/2004 | Root et al. | |
| 2004/0068364 A1 | 4/2004 | Zhao et al. | |
| 2004/0081133 A1 | 4/2004 | Smavatkul et al. | |
| 2004/0087317 A1 | 5/2004 | Caci | |
| 2004/0102192 A1 | 5/2004 | Serceki | |
| 2004/0124977 A1 | 7/2004 | Biffar | |
| 2004/0157624 A1 | 8/2004 | Hrastar | |
| 2004/0162896 A1 | 8/2004 | Cen et al. | |
| 2004/0193367 A1 | 9/2004 | Cline | |
| 2004/0203847 A1 | 10/2004 | Knauerhase et al. | |
| 2004/0203904 A1 | 10/2004 | Gwon et al. | |
| 2004/0204063 A1 | 10/2004 | Van Erlach | |
| 2004/0205234 A1 | 10/2004 | Barrack et al. | |
| 2004/0263388 A1 | 12/2004 | Krumm et al. | |
| 2005/0020266 A1 | 1/2005 | Backes et al. | |
| 2005/0021781 A1 | 1/2005 | Sunder et al. | |
| 2005/0037775 A1 | 2/2005 | Moeglein et al. | |
| 2005/0043040 A1 | 2/2005 | Contractor | |
| 2005/0055374 A1 | 3/2005 | Sato | |
| 2005/0108306 A1 | 5/2005 | Catalasan | |
| 2005/0136845 A1 | 6/2005 | Masuoka et al. | |
| 2005/0164710 A1 | 7/2005 | Beuck | |
| 2005/0192024 A1 | 9/2005 | Sheynblat | |
| 2005/0227711 A1 | 10/2005 | Orwant et al. | |
| 2005/0232189 A1 | 10/2005 | Loushine | |
| 2005/0251326 A1 | 11/2005 | Reeves | |
| 2006/0002326 A1 | 1/2006 | Vesuna | |
| 2006/0009235 A1 | 1/2006 | Sheynblat et al. | |
| 2006/0040640 A1 | 2/2006 | Thompson et al. | |
| 2006/0046709 A1 | 3/2006 | Krumm et al. | |
| 2006/0058957 A1 | 3/2006 | Hickenlooper et al. | |
| 2006/0058958 A1 | 3/2006 | Galbreath et al. | |
| 2006/0061476 A1 | 3/2006 | Patil et al. | |
| 2006/0078122 A1 | 4/2006 | Dacosta | |
| 2006/0089157 A1 | 4/2006 | Casey et al. | |
| 2006/0089160 A1 | 4/2006 | Othmer | |
| 2006/0092015 A1 | 5/2006 | Agrawal et al. | |
| 2006/0128397 A1 | 6/2006 | Choti et al. | |
| 2006/0197704 A1 | 9/2006 | Luzzatto et al. | |
| 2006/0200843 A1 | 9/2006 | Morgan et al. | |
| 2006/0221918 A1 | 10/2006 | Wang | |

(56) References Cited

U.S. PATENT DOCUMENTS

| | | | |
|---|---|---|---|
| 2006/0240840 A1 | 10/2006 | Morgan et al. |
| 2006/0270421 A1 | 11/2006 | Phillips et al. |
| 2006/0293064 A1 | 12/2006 | Robertson et al. |
| 2007/0004428 A1 | 1/2007 | Morgan et al. |
| 2007/0097511 A1 | 5/2007 | Das et al. |
| 2007/0100955 A1 | 5/2007 | Bodner |
| 2007/0110053 A1 | 5/2007 | Soni et al. |
| 2007/0121560 A1 | 5/2007 | Edge |
| 2007/0126635 A1 | 6/2007 | Houri |
| 2007/0149240 A1 | 6/2007 | Brok |
| 2007/0150516 A1 | 6/2007 | Morgan et al. |
| 2007/0178911 A1 | 8/2007 | Baumeister et al. |
| 2007/0184846 A1 | 8/2007 | Horton et al. |
| 2007/0210961 A1 | 9/2007 | Romijn |
| 2007/0232892 A1 | 10/2007 | Alizadeh-Shabdiz et al. |
| 2007/0258409 A1 | 11/2007 | Alizadeh-Shabdiz et al. |
| 2007/0258420 A1 | 11/2007 | Alizadeh-Shabdiz et al. |
| 2007/0270157 A1 | 11/2007 | Kim et al. |
| 2008/0004888 A1 | 1/2008 | Davis et al. |
| 2008/0008117 A1 | 1/2008 | Alizadeh-Shabdiz |
| 2008/0008118 A1 | 1/2008 | Alizadeh-Shabdiz |
| 2008/0008119 A1 | 1/2008 | Alizadeh-Shabdiz |
| 2008/0008121 A1 | 1/2008 | Alizadeh-Shabdiz |
| 2008/0033646 A1 | 2/2008 | Morgan et al. |
| 2008/0045234 A1 | 2/2008 | Reed |
| 2008/0108371 A1 | 5/2008 | Alizadeh-Shabdiz et al. |
| 2008/0132170 A1 | 6/2008 | Alizadeh-Shabdiz et al. |
| 2008/0133124 A1 | 6/2008 | Sarkeshik |
| 2008/0133336 A1 | 6/2008 | Altman et al. |
| 2008/0139219 A1 | 6/2008 | Boeiro et al. |
| 2008/0176583 A1 | 7/2008 | Brachet et al. |
| 2008/0188242 A1 | 8/2008 | Carlson et al. |
| 2008/0209492 A1* | 8/2008 | Matsuura et al. ............. 725/117 |
| 2008/0248741 A1 | 10/2008 | Alizadeh-Shabdiz |
| 2008/0248808 A1 | 10/2008 | Alizadeh-Shabdiz |
| 2008/0261622 A1 | 10/2008 | Lee et al. |
| 2008/0274752 A1 | 11/2008 | Houri |
| 2008/0288493 A1 | 11/2008 | Yang et al. |
| 2009/0075672 A1 | 3/2009 | Jones et al. |
| 2009/0147767 A1 | 6/2009 | Lee |
| 2009/0149197 A1 | 6/2009 | Morgan et al. |
| 2009/0175189 A1 | 7/2009 | Alizadeh-Shabdiz et al. |
| 2009/0252138 A1 | 10/2009 | Alizadeh-Shabdiz et al. |
| 2009/0286504 A1 | 11/2009 | Krasner et al. |
| 2009/0286549 A1 | 11/2009 | Canon et al. |
| 2009/0303112 A1 | 12/2009 | Alizadeh-Shabdiz |
| 2009/0303113 A1 | 12/2009 | Alizadeh-Shabdiz |
| 2009/0303114 A1 | 12/2009 | Alizadeh-Shabdiz |
| 2009/0303115 A1 | 12/2009 | Alizadeh-Shabdiz |
| 2009/0303119 A1 | 12/2009 | Alizadeh-Shabdiz |
| 2009/0303120 A1 | 12/2009 | Alizadeh-Shabdiz |
| 2009/0303121 A1 | 12/2009 | Alizadeh-Shabdiz |
| 2009/0310585 A1 | 12/2009 | Alizadeh-Shabdiz |
| 2009/0312035 A1 | 12/2009 | Alizadeh-Shabdiz |
| 2009/0312036 A1 | 12/2009 | Alizadeh-Shabdiz |
| 2010/0052983 A1 | 3/2010 | Alizadeh-Shabdiz |
| 2011/0012780 A1 | 1/2011 | Alizadeh-Shabdiz |
| 2011/0012784 A1 | 1/2011 | Alizadeh-Shabdiz |
| 2011/0021207 A1 | 1/2011 | Morgan et al. |
| 2011/0034179 A1 | 2/2011 | David et al. |
| 2011/0035420 A1 | 2/2011 | Alizadeh-Shabdiz et al. |
| 2011/0045840 A1 | 2/2011 | Alizadeh-Shabdiz et al. |
| 2011/0058495 A1 | 3/2011 | Alizadeh-Shabdiz et al. |
| 2011/0069828 A1 | 3/2011 | Erhart et al. |
| 2011/0074626 A1 | 3/2011 | Alizadeh-Shabdiz et al. |
| 2011/0080317 A1 | 4/2011 | Alizadeh-Shabdiz et al. |
| 2011/0080318 A1 | 4/2011 | Alizadeh-Shabdiz et al. |
| 2011/0080841 A1 | 4/2011 | Alizadeh-Shabdiz et al. |
| 2011/0084881 A1 | 4/2011 | Fischer |
| 2011/0164522 A1 | 7/2011 | Alizadeh-Shabdiz et al. |
| 2011/0176494 A1 | 7/2011 | Huang et al. |
| 2011/0235532 A1 | 9/2011 | Alizadeh-Shabdiz et al. |
| 2011/0235623 A1 | 9/2011 | Alizadeh-Shabdiz et al. |
| 2011/0244887 A1* | 10/2011 | Dupray et al. ............. 455/456.2 |
| 2011/0287783 A1 | 11/2011 | Alizadeh-Shabdiz et al. |
| 2011/0298659 A1 | 12/2011 | Alizadeh-Shabdiz |
| 2011/0298660 A1 | 12/2011 | Alizadeh-Shabdiz |
| 2011/0298663 A1 | 12/2011 | Alizadeh-Shabdiz |
| 2011/0298664 A1 | 12/2011 | Alizadeh-Shabdiz |
| 2011/0306357 A1 | 12/2011 | Alizadeh-Shabdiz et al. |
| 2011/0306358 A1 | 12/2011 | Alizadeh-Shabdiz et al. |
| 2011/0306359 A1 | 12/2011 | Alizadeh-Shabdiz et al. |
| 2011/0306360 A1 | 12/2011 | Alizadeh-Shabdiz et al. |
| 2011/0306361 A1 | 12/2011 | Alizadeh-Shabdiz et al. |
| 2012/0007775 A1 | 1/2012 | Alizadeh-Shabdiz |
| 2012/0071175 A1 | 3/2012 | Skibiski et al. |
| 2012/0100872 A1 | 4/2012 | Alizadeh-Shabdiz et al. |
| 2012/0108260 A1 | 5/2012 | Alizadeh-Shabdiz |
| 2012/0112958 A1 | 5/2012 | Alizadeh-Shabdiz et al. |
| 2012/0178477 A1 | 7/2012 | Morgan et al. |
| 2012/0196621 A1 | 8/2012 | Alizadeh-Shabdiz et al. |
| 2012/0280866 A1 | 11/2012 | Alizadeh-Shabdiz |
| 2012/0284118 A1 | 11/2012 | Mamich, Jr. et al. |
| 2012/0309420 A1 | 12/2012 | Morgan et al. |
| 2013/0072227 A1 | 3/2013 | Morgan et al. |

FOREIGN PATENT DOCUMENTS

| | | |
|---|---|---|
| WO | WO-2007081356 | 7/2007 |
| WO | WO-2007101107 | 9/2007 |
| WO | WO-2009086278 A1 | 7/2009 |
| WO | WO-2009124349 A1 | 10/2009 |
| WO | WO-2011119575 | 9/2011 |
| WO | WO-2011156549 | 12/2011 |

OTHER PUBLICATIONS

Curran, et al., "Pinpointing Users with Location Estimation Techniques and Wi-Fi Hotspot Technology," International Journal of Network Management, 2008, DOI: 10.1002/nem.683, 15 pages.

Griswold, et al., "ActiveCampus—Sustaining Educational Communities through Mobile Technology." UCSD CSE Technical Report #CS200-0714, 2002, 19 pages.

Griswold, et al., "ActiveCampus: Experiments in Community-Oriented Ubiquitous Computing," IEEE, Oct. 2004, pp. 73-81.

Hazas, et al., "Location-Aware Computing Comes of Age," IEEE, vol. 37, Feb. 2004, 3 pages.

Hellebrandt, M., et al., "Estimating Position and Velocity of Mobile in a Cellular Radio Network," IEEE Transactions on Vehicular Technology, vol. 46, No. 1, Feb. 1997, pp. 65-71.

International Search Report and Written Opinion of the International Search Authority, the United States Patent and Trademark Office, for International Application No. PCT//US2010/045438, dated Oct. 6, 2010, 9 pages.

International Search Report and Written Opinion of the International Searching Authority, The United States Patent and Trademark Office, for International Application No. PCT/US2006/06041, dated Nov. 16, 2007, 4 pages.

International Search Report and Written Opinion of the International Searching Authority, the United States Patent and Trademark Office, for International Application No. PCT/US2008/058345, dated Jun. 30, 2008, 7 pages.

International Search Report and Written Opinion of the International Searching Authority, the United States Patent and Trademark Office, for International Application No. PCT/US2011/029379, dated Jun. 1, 2011, 15 pages.

International Search Report and Written Opinion of the International Searching Authority, The United States Patent and Trademark Office, for International Application No. PCT/US2011/039717, dated Dec. 20, 2011; 13 pages.

International Search Report and Written Opinion of the International Searching Authority, the United States Patent and Trademark Office, for PCT/US2006/07299, dated Feb. 11, 2008, 7 pages.

International Search Report and Written Opinion of the Searching Authority, the United States Patent and Trademark Office, for International Application No. PCT/US2006/045327, dated Jun. 24, 2008, 6 pages.

International Search Report and Written Opinion of the Searching Authority, the United States Patent and Trademark Office, for International Application No. PCT/US208/87969, mailed Mar. 10, 2009, 6 pages.

(56) References Cited

OTHER PUBLICATIONS

International Search Report and Written Opinion of the Searching Authority, the United States Patent and Trademark Office, for International Application No. PCT/US05/39208, mailed Jan. 29, 2008, 4 pages.
International Search Report and Written Opinion of the Searching Authority, the United States Patent and Trademark Office, for International Application No. PCT/US07/62721, mailed Nov. 9, 2007, 8 pages.
Kawabata, K. et al., "Estimating Velocity Using Diversity Reception," IEEE, 1994, pp. 371-374.
Kim, et al., "Risks of Using AP Locations Discovered through War Driving," Lecture Notes in Computer Science, vol. 3968, 2006, 15 pages.
Kirsner, S., "One more way to find yourself," The Boston Globe, May 23, 2005, Retrieved from www.boston.com, 2 pages.
Krumm, et al., "LOCADIO: Inferring Motion and Location from Wi-Fi Signal Strengths," Mobiquitous 2004, First Annual International Conference on Mobile and Ubiquitous Systems: Networking and Services, Aug. 22-26, 2004, 10 pages.
Kwan, M., " Graphic Programming Using Odd or Even Points," Chinese Math. 1, 1960. (273-277).
LaMarca, et al., "Place Lab: Device Positioning Using Radio Beacons in the Wild," Intel Corporation, 2004, 20 pages.
LaMarca, et al., "Self-Mapping in 802.11 Location Systems," Intel Corporation, 2005, 18 pages.
Zhou, R. "Wireless Indoor Tracking System (WITS)," Jul. 2006, retrieved on May 11, 2011 from the internet: <URLhttp://www.ks.uni-freiburg.de/assist/rui/index.php?page=publications>, entire document, 15 pages.
Muthukrishnan, et al., "Towards Smart Surroundings: Enabling Techniques and Technologies for Localization," Lecture Notes in Computer Science, vol. 3479, May 2005, 11 pages.
Schilit, et al., "Challenge: Ubiquitous Location-Aware Computing and the "Place Lab" Initiative," WMASH'03, Sep. 2003, San Diego, CA, 7 pages.
Supplementary European Search Report for European Application No. 07757413, dated Apr. 6, 2010, 10 pages.
Terminal Equipment and Protocols for Telematic Services, CCITT, The International Telegraph and Telephone Consultative Committee, International Telecommunication Union, Sep. 1992, 186 pages.
Weisstein, Eric W., "Chinese Postman Problem," Mathword—A Wolfram Web Resource, retrieved from http://mathworld.wolfram.com/ChinesePostmanProblem.html, 2010, 1 page.
Wikipedia entry for "Huffman coding," http://en.wikipedia.org/wiki/Huffman_coding, 2006. 6 pgs.

* cited by examiner

METHODS OF AND SYSTEMS FOR MEASURING BEACON STABILITY OF WIRELESS ACCESS POINTS

CROSS-REFERENCE TO RELATED APPLICATIONS

This application is a continuation of U.S. patent application Ser. No. 13/156,576, entitled Methods of and Systems for Measuring Beacon Stability of Wireless Access Points, filed Jun. 9, 2011, which claims the benefit under 35 U.S.C. §119(e) of U.S. Patent Application No. 61/353,936, entitled Methods of and Systems for Measuring Beacon Stability of Wireless Access Points, filed Jun. 11, 2010, and U.S. Patent Application No. 61/440,940, entitled Methods of and Systems for Measuring Beacon Stability of Wireless Access Points, filed Feb. 9, 2011, the contents of each of which are incorporated by referenced herein.

This application is also related to the following applications, each of which was filed on Jun. 9, 2011, the contents of which are incorporated by reference herein:

U.S. patent application Ser. No. 13/156,564, entitled Systems for and Methods of Determining Likelihood of Mobility of Reference Points in a Positioning System;

U.S. patent application Ser. No. 13/156,543, entitled Systems for and Methods of Determining Likelihood of Relocation of Reference Points in a Positioning System;

U.S. patent application Ser. No. 13/156,530, entitled Systems for and Methods of Determining Likelihood of Reference Point Identity Duplication in a Positioning System; and U.S. patent application Ser. No. 13/156,521, entitled Systems for and Methods of Determining Likelihood of Atypical Transmission Characteristics of Reference Points in a Positioning System.

BACKGROUND OF THE INVENTION

1. Field of Invention

The invention generally relates to position estimates by a positioning system, and, more specifically, to the identification and/or quantification of features of positioning system reference points that indicate the reference points could yield unreliable and/or deceptive positioning information, and, in some cases, should not be relied upon for positioning information.

2. Description of Related Art

In recent years, mobile and portable communication and computing devices have become ubiquitous, and wireless communication systems have expanded to meet the corresponding demand for connectivity. Mobile and portable devices have no fixed locations and often accompany their users as they move, and application developers have seized on the opportunity to create applications that update or adapt based on the locations of the mobile devices running the applications. Intuitive examples include maps that update to indicate the current position of the device or advertisements that adapt based on proximity to a particular point of interest.

In order to enable location-aware applications, device makers must make their devices capable of acquiring position information with minimal user input. On the regulatory front, the FCC enhanced 911 rules mandate that mobile telephones must be able to supply location information to emergency operators when making 911 calls. One conventional solution to the problem of device positioning is GPS, which uses transmissions from satellites that follow carefully prescribed orbits. Unfortunately, GPS often fails to cover indoor and densely developed urban areas, requires dedicated hardware, and often suffers from slow time to first fix. Thus, more and more positioning systems are based on "beacons of opportunity" such as IEEE 802.11 access points and cellular base stations. They use transmissions from existing wireless communication systems that are received by the standard hardware of the mobile device and combine them with known information about the beacons to determine the position of the mobile device. Such systems effectively complement GPS coverage areas while providing fast time to first fix and requiring no dedicated hardware.

There are currently numerous beacon-based positioning systems both in the research community and in commercial and industrial deployments, and they can be broadly divided into those that use pattern matching (also known as fingerprinting) and those that use distance estimates to known reference points. Pattern matching positioning technologies as developed by Placelab and others ("Practical Metropolitan-Scale Positioning for GSM Phones", Chen et al.) estimate the position of the client device by matching its observations to a map of received signal values collected in the area.

In contrast, systems that use distance estimates explicitly estimate beacon locations rather than simply mapping the patterns of received signal strength from the beacons. Such systems then estimate the range from the client device to the observed beacons based either on signal propagation time or received signal strength (RSS).

Time-based systems use measurements of the time between transmission and reception of a signal to estimate the distance between the transmitter and the receiver. Such systems employ time of arrival (TOA) or time-difference of arrival (TDOA) schemes to generate range estimates for use in a variety of algorithms to generate position estimates for the user (U.S. Pat. No. RE38,808, Schuchman, et al; US 2002/007715 A1, Ruutu, et al). However, in asynchronous systems such as GSM and UMTS, additional equipment is often installed at each cell at significant additional cost (U.S. Pat. No. 6,275,705 B1, Drane, et al; U.S. Pat. No. 6,526,039 B1, Dahlman, et al.; U.S. Pat. No. 6,901,264 B2, Myr).

Systems that use received signal strength (RSS) to estimate the distance from the mobile to the transmitting beacon use the fact that RSS is strongly related to the distance from the transmitter to the receiver ("Indoor/Outdoor Location of Cellular Handsets Based on Received Signal Strength" by Zhu and Durgin). Well-known pathloss models show that signal power falls exponentially with distance, so knowledge of the pathloss exponent and other parameters such as antenna gain and transmit power allows the positioning system to compute range estimates. Several well-known beacon-based positioning systems use this approach, notably in the form of wi-fi positioning (WPS) based on IEEE 802.11 access points.

BRIEF SUMMARY OF THE INVENTION

Brief Summary of the Disclosure

In one aspect, the invention provides methods of and systems for measuring beacon stability of wireless access points.

In another aspect of the invention, a method of determining a measure of likelihood that a designated wireless device exhibits at least one pathological characteristic, the pathological characteristic causing errors in position estimation to occur when the designated wireless device is used as a landmark in a position estimation system if left uncorrected includes determining a set of one or more reference points associated with a designated wireless device. The one or more of the reference points being at least one of (i) a geographic position at which signals from the designated wireless device were detected and (ii) another wireless device from which signals were also detected by a receiver within a selected period of time during which the signals from the designated wireless device were detected by the receiver. The method also includes retrieving at least one of (i) attributes of the reference points of the set, (ii) attributes associated with the reception of signals from the designated wireless device and the another wireless device within the selected period of time, and (iii) statistical information about at least one of: a temporal distribution of times of detection of signals of reference points of the set, a spatial distribution of the reference points, and a cardinality of the set or at least one subset of the reference points. The method further includes determining a measure of likelihood that the designated wireless device exhibits at least one pathological characteristic based on at least one of (i) attributes of the reference points, (ii) attributes associated with the reception of signals, and (iii) the statistical information.

In a further aspect of the invention, the measure of likelihood is a binary decision.

In yet another aspect of the invention, the measure of likelihood is a relative measure of a probability that the designated wireless device exhibits the at least one pathological characteristic.

In still a further aspect of the invention, the method also includes determining a measure of likelihood that a wireless device other than the designated wireless device exhibits at least one pathological characteristic based on the other wireless device having a relationship with the designated wireless device. The existence of the relationship is based on the designated wireless device and the other wireless device being within signal reception range of a same position within a given period of time.

In another aspect of the invention, the designated wireless device has a first identifier and the method also includes determining a second measure of likelihood that a second designated wireless device exhibits at least one pathological characteristic based on a comparison of the first identifier and a second identifier associated with the second designated wireless device.

In a further aspect of the invention, the at least one pathological characteristic includes the designated wireless device being a mobile device which lacks a fixed geographic position.

In yet another aspect of the invention, the at least one pathological characteristic includes the designated wireless device exhibiting signal transmission characteristics that are atypical of a wireless device of a type matching the designated wireless device.

In still a further aspect of the invention, the at least one pathological characteristic includes that the location information associated with the designated wireless device is not an accurate present location of the wireless device In another aspect of the invention, the at least one pathological characteristic includes that an identifier associated with the designated wireless devices is also associated with at least one other wireless device.

In a further aspect of the invention, the designated wireless device has an identifier and the method also includes associating, in a reference database, the identifier with an indication of the measure of likelihood.

In yet another aspect of the invention, the designated wireless device is a WiFi-enabled access point.

In still a further aspect of the invention, the designated wireless device is a mobile telephone transceiver installation.

In another aspect of the invention, for reference points of the set that are another wireless device, the another wireless device of the set is at least one of a WiFi-enabled access point and a mobile telephone transceiver installation.

In a further aspect of the invention, the attributes of the reference points of the set including location information specifying estimated geographic locations of the reference points of the set. The method also includes grouping each reference point of the set into clusters of at least one reference point based on the location information of the corresponding reference point, and, for each cluster, determining attributes of the cluster based on at least one of (i) attributes of the reference points of the set, (ii) attributes associated with the reception of signals from the designated wireless device and the another wireless device within the selected period of time. The method further includes the determining the measure of likelihood being further based on the attributes of at least one cluster.

In still another aspect of the invention, a system for determining a measure of likelihood that a designated wireless device exhibits at least one pathological characteristic, the pathological characteristic causing errors in position estimation to occur when the designated wireless device is used as a landmark in a position estimation system if left uncorrected includes a computer readable media including instructions that when executed by a computer system cause the computer system to perform any of the methods recited above.

Any of the aspects recited herein can be used in combination with any of the embodiments disclosed herein.

DETAILED DESCRIPTION OF THE EMBODIMENTS

Embodiments relate to the use of wireless communication devices, such as IEEE 802.11 access points, as reference points for estimating the positions of client devices such as cellular telephones, notebook computers, tablet computers, gaming systems, and other wireless-enabled devices. The word beacon is used in this document to refer to wireless communication devices that are used as reference points (or landmarks) for positioning. Such a positioning system requires the creation and maintenance of a database of beacon attributes. Beacons that move or otherwise defy accurate characterization (herein referred to as pathological beacons) can cause large errors when estimating the position of client devices, so such beacons must be detected and corrected in the database. Implementations of the invention provide techniques for detecting pathological beacons.

The term "reference point", as used herein, refers to beacons as well points and/or other devices that are used in the determination of stability measures for the beacons. This is set forth in more detail below.

Under one aspect of the invention, distinct pathological beacon behaviors, observables, and methods to quantify the likelihood that a beacon exhibits one or more of the various pathologies are defined. As described herein, these likelihoods are called "probabilities", which can encompass a formal probability estimate as well as any other expression of relative likelihood. The individual pathology probabilities are extended to create an aggregate probability of pathology that determines the overall stability and reliability of a single beacon. Finally, the stability of individual beacons are extended to quantify the reliability of an ensemble of beacons and propagate through a beacon graph.

In certain embodiments, stability is defined as a metric characterizing the likelihood that a beacon will remain at the location (e.g. latitude, longitude and altitude) and continue to exhibit the attributes recorded in the beacon database and characteristics typical of the particular beacon type.

Observables and Parameters

Figure 1:
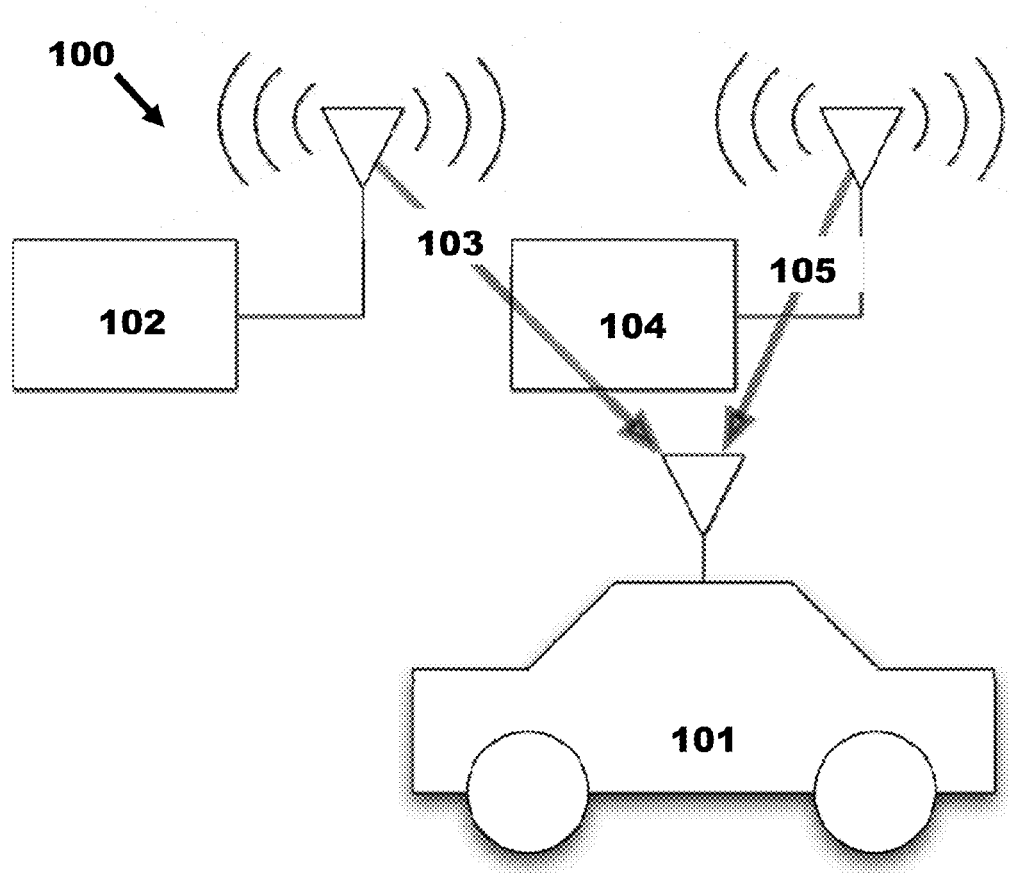
FIG. 1 shows an example of a scan observation.

Certain embodiments characterize beacons either through direct submissions or scans. Direct submissions involve the manual collection of beacon identification and location information. FIG. 1 shows an example of a scan observation. Scans 100 use signals 103 received from the beacon 102 to record where, when, and at what power level the beacon was observed. Scans can further be divided into those collected by client devices and those collected systematically by specialized scanning devices 101. Finally, by accumulating a set of scans, the beacon database can be populated with attributes characterizing the expected behavior of each beacon and the stability or likelihood that each beacon will continue to conform to its expected behavior.

In some embodiments, the attributes that follow are accumulated over time to show the history of the beacons and their relationships to one another. Such a history captures patterns of behavior that render a beacon particularly stable or unstable, and reveals features that would not be evident in a single snapshot of the ensemble of attributes.

Submissions

Submissions, as used herein, describe the sharing of beacon information that has been collected or cataloged without using a scanning device. Submissions often come from users or institutions interested in improving the performance of the wireless positioning system in their home, office, or campus, and they can be used to refine and augment scan records. Submissions may contain any or all of the following attributes: beacon identifier, beacon type, co-located beacons, beacon operator, beacon location, submission time, submission source, submission quality, and miscellaneous beacon hardware and software information.

Beacon identifiers include information such as MAC addresses of 802.11 access points or the cell IDs of cellular base stations. In general, beacon identifiers can be used to distinguish between multiple beacons of the same type. Beacon type includes information related to the standards or protocols under which the beacon operates, e.g. IEEE 802.11 (Wi-Fi) or 802.16 (WiMax), Bluetooth, GSM, etc. Co-located beacons are the identifiers of other beacons that are either housed within the same hardware or installed in the same location as the beacon whose information is being submitted.

The beacon operator is the individual or entity that owns or operates the beacon, not necessarily the same individual or entity that generated the submission. For instance, the operator could be a telecommunications company that operates a network of Wi-Fi hotspots, and the submission might come from a bookstore that has one of the hotspots installed.

Beacon location information can take many forms including coordinates such as latitude, longitude, and altitude. Alternatively or in addition, beacon location can be described by metropolitan or regional identifiers such as street address, building, floor, room, city, county, state, zip code, region, or country. Finally, beacon location can be described based on physical characteristics of the land, water, and buildings in the area.

Submission time and source describe when the submission occurred and the individual or entity responsible for the submission. The submission quality relates to the accuracy and trustworthiness of the submission source. For instance, a coffee shop might submit the locations of their Wi-Fi access points with a location accurate to within 10 meters whereas a university might submit locations accurate to 1 meter. In that case, the university submissions would be deemed to have a higher submission quality.

Other possible submission information includes the manufacturer and model of the beacon, hardware and software configurations, installation details, and the beacon operator. Hardware configurations can include information related to antennas, radios and amplifiers. Software (including firmware) configurations can include channel or frequency settings, encryption, power control algorithms, and other modes or capabilities. Installation details can include information related to the position and orientation of the beacon as well as whether the beacon is indoor or outdoor, the orientation of directional antennas, and whether the installation is temporary or permanent or fixed or mobile. For instance, a submission of a UMTS beacon could include the azimuth, antenna pattern, altitude, and downtilt of the sectorized antennas.

Scans

Referring again to FIG. 1, scans 100 record the characteristics of signals 103, 105 (e.g., received signal strength, time of transmission, time of reception) received from beacons 102, 104 along with any available side information about the circumstances under which the data was collected. In particular, while it is typically desirable to collect as much information as possible with each scan, scans may or may not include information about the location at which the scan was performed. Dedicated scanning devices 101 or client devices may perform scans. For example, an organization may deploy a dedicated scanning device 101 for the express purpose of generating beacon records, whereas a user operating a client device may collect scan data as a byproduct of normal use (e.g., voice conversation, navigation, games, internet communication). While users may decide to purposely contribute scan data to the generation of a beacon database, the distinction lies in the primary function of the scanning device rather than the intent of the individual operating the scanner.

Scans may include any or all of the following attributes: beacon identifiers, beacon type, scan location information, received signal characteristics, scan time and date, and scanning device information. Beacon identifiers can include both unique identifiers and non-unique identifiers. Unique identifiers are often mandated by standards in order to allow the coexistence of multiple beacons. For instance, MAC addresses in 802.11 and Cell Global Identification (CGI) in GSM are both required to be globally unique identifiers by their respective standards. Non-unique identifiers can include user-configurable names such as SSID in 802.11.

Beacon type includes information related to the standards or protocols under which the beacon operates, e.g. IEEE 802.11 (Wi-Fi) or 802.16 (WiMax), Bluetooth, GSM, UMTS etc.

Scan location information can include estimated scanner location, estimation accuracy, scanner location source, and other location related to the position of the scanner at the time of the scan. The estimated scanner location can be expressed in coordinates such as latitude, longitude, and altitude, and it may also include velocity information. The estimation accuracy expresses the expected error in the estimate of the scan location. For instance, the accuracy of estimated position provided by a GPS system is often characterized as a function of the number, orientations, and signal strengths of the satellites used for positioning.

The scanner location source contains information related to the systems and methods used to estimate the location of the scanner during the collection of the scan. For instance, scanner location may be provided by GPS or by the manual entry of coordinates by an individual operating the scanning device. In addition, the estimated scanner location may be generated by the same positioning system that will in turn use the scan to update its beacon database. In any case, the scanner location source can contain detailed records of the identities and signal characteristics of the reference points used to generate the position estimate. Those records can then be used to describe the quality of the scanner location estimate or the quality of the reference points used to derive the location. For instance, if the scanner was positioned based on Wi-Fi access points, the identities of those access points provide information about the quality of the estimated scanner location as well as the quality of the estimated positions of the access points themselves.

Other location information can include local identifiers and physical characteristics. Local identifiers can include components of the civic address such as street address, building, floor, room, city, county, state, zip code, region, or country. Physical characteristics include information related to the land, water, and buildings in the area as well as information such as whether the scan was collected indoors or outdoors.

Received signal characteristics include information related to the beacon transmissions that were received by the scanning device. They can include received signal strength (RSS), channel or frequency of the signal, and the noise level at the scanner.

Scanning device information can include scanner identifiers, scanner type, manufacturer and model information, and software and hardware configurations. Scanner identifiers may or may not be globally unique. Scanner types may include both dedicated scanning devices, used expressly for the purpose of creating a database of beacons, and client devices, non-dedicated devices that collect scans intentionally or as a byproduct of other activities.

Beacon Attributes

By collecting relevant scans and submissions, certain embodiments generate a series of attributes for each beacon in the database. In addition to being used to diagnose pathologies and assess overall beacon stability, beacon attributes serve important roles in positioning client devices. After pathology probabilities and stability values have been determined for a beacon, they can be stored as attributes and fed back into the pathology and stability functions of the original beacon and other beacons in the database. In addition, as relevant information accumulates over time, beacon attributes may change, and the historical record of attribute evolution can itself be an attribute of the beacon.

Beacon attributes may include one or more versions of any or all of the following parameters: identifiers, position information, stability information, observation information, and beacon features. Beacon identifiers can include both unique identifiers and non-unique identifiers. Unique identifiers are often mandated by standards in order to allow the coexistence of multiple beacons. For instance, MAC addresses in 802.11 and Cell Global Identification (CGI) in GSM are both required to be globally unique identifiers by their respective standards. Non-unique identifiers can include user-configurable names such as SSID in 802.11.

Beacon position information can include estimated beacon location, estimation accuracy, and other information related to the scans or submissions used to estimate the position of the beacon. The estimated beacon location can be expressed in coordinates such as latitude, longitude, and altitude. The estimation accuracy expresses the expected error in the estimate of the beacon location, which is often a function of the number and attributes of scans and submissions used to estimate the beacon position.

Other beacon location information can include local identifiers and physical characteristics. Local identifiers can include components of the civic address such as street address, building, floor, room, city, county, state, zip code, region, or country. Physical characteristics include information related to the land, water, and buildings in the area as well as information such as whether the beacon is believed to be indoors or outdoors. Stability information contains information related to the likelihood that the beacon will exhibit any pathological behavior and can include both aggregate stability values and values associated with individual pathologies.

Observation information relates to the times, places, and frequency with which the beacon was scanned and can include age, quiet time, duration, number of observations, observation types, observation frequency, and coverage area. The age of a beacon is defined as the length of time since the first observation of the beacon, and the quiet time is the length of time since the last observation of the beacon. The duration is the length of time between the first and last observations of the beacon, number of observations is the total number of scans in which the beacon has appeared. Observation types relate to the attributes of the scans or submissions relevant to the beacon.

Observation frequency describes the temporal distribution of observations. It can take the form of a simple average (total observations divided by total duration), a piecewise average (observations during a certain interval divided by the length of that interval), or more advanced statistics related to the precise temporal distribution of observations.

Coverage area is the spatial equivalent of observation frequency in that it describes, with some degree of granularity, the spatial distribution of observations. For instance, coverage area can be the radius of the smallest circle that contains observations of the beacon, a set of disjoint rectangles of a certain size that contain the observations, or more advanced statistics related to the precise spatial distribution of the observations.

Beacon features can include information such as the manufacturer and model of the beacon, hardware and software configurations, installation details, and the beacon operator—all of which can be derived from scans or submissions or both. Hardware configurations can include information related to antennas, radios and amplifiers. Software (including firmware) configurations can include channel or frequency settings, encryption, power control algorithms, and other modes or capabilities. Installation details can include information related to the position and orientation of the beacon as well as whether the beacon is indoor or outdoor, the orientation of directional antennas, and whether the installation is temporary or permanent or fixed or mobile. Finally, beacon features can include the identities of any other beacons that are either housed in the same hardware or installed in the same location (co-located beacons).

Relationships

Under one aspect of the invention, when multiple beacons (e.g., beacons 102, 104 of FIG. 1) appear in the same scan (e.g., scan 100) or submission, a relationship is generated and attributes are assigned to each relationship based on the circumstances under which the beacons were observed. Specifically, a relationship captures the fact that two or more beacons were within signaling range of a single point within a window of time. As with beacons and their attributes, relationships can be stored in a database for future use. Some embodiments index relationships using the unique identifiers of the related beacons, which enables one to easily query the database for relationships including a particular beacon.

In certain embodiments, a relationship between beacons that are believed to be outside of signaling range of one another indicates that one or more beacons are exhibiting a pathology. Further, if the relationship was captured by a scan or submission without explicit location information, then the relationship may indicate the presence of a pathological beacon or beacons without directly delineating which beacons are pathological and which are not. For example, if two beacons are believed to be positioned 100 km apart and have transmission ranges of 1 km, then an unpositioned scan in which signals were received from both beacons would indicate that one or both beacons were either incorrectly positioned or had an incorrectly characterized transmission range. The third alternative, which arises with some frequency particularly in end user devices, is that the beacons were not actually observed within a given time period, but through caching or some similar behavior the scanning device stored the scans as if they were simultaneous and gave rise to a spurious relationship.

Relationships can have attributes of any or all of the following types: associated beacons, spatial features, temporal features, family indicators, and quality metrics.

The list of associated beacons contains the identifiers of the beacons connected by the relationship, and spatial features describe the spatial relationships between those beacons. Specifically, spatial features can include information related to the locations from which the relationship was observed and the estimated distances between the associated beacons—the physical distance spanned by the relationship. In addition, spatial features can include more detailed expressions or statistical measures related to the area or areas in which the relationship has been observed.

Temporal features of a relationship can include the age, quiet time, duration, and observation frequency. The age of the relationship is the time since the first observation of the relationship, and the quiet time is the time since the last observation of the relationship. The duration is the length of time between the first and last observations of the relationship, and the observation frequency relates to the temporal distribution of the observations of the relationship. Observation frequency can be as simple as the average number of observations per unit time during the duration of the relationship or as sophisticated as statistical measures of the burstiness of the observations and length of gaps between observations.

Family indicators indicate whether the beacons connected by the relationship are believed to be a family based on scans, submissions, or side information. Specifically, a family of beacons is a group of two or more beacons that would be expected to relocate as a group. Families often arise when two or more beacons are owned and/or operated by a single entity or individual. Thus, if the entity or individual relocated to a new location, then the associated beacons would be moved to the new location as a group.

Quality metrics quantify the likelihood that the relationship is indicative of the current physical proximity of the set of associated beacons. For instance, a relationship that has not been observed for a long time (large quiet time) might receive a lower quality value than an otherwise similar relationship that had been observed more recently. In general, quality metrics can be functions of any or all of the attributes of the associated beacons and the scans and submissions related to those beacons.

As described in detail above, scans and relationships provide information about beacons. Specifically, one type of information provided by both scans and relationships is that a particular beacon of interest is within a certain distance of a given geographic location (the distance is related to the typical transmit distance of the beacon of interest). Another type of information provided by both scans and relationships is the likelihood that the beacon of interest is still within the distance at a given point in time. Thus, in the examples for detecting pathologies that follow, scans and relationships can be used interchangeably. Therefore, although a particular example recites that attributes of a relationship or attributes of a related beacon are used when determining the probability that a beacon of interest is exhibiting a pathology, attributes of scans of the beacon of interest can be used in place of the relationship or related beacon attributes.

Graphs

Figure 2:
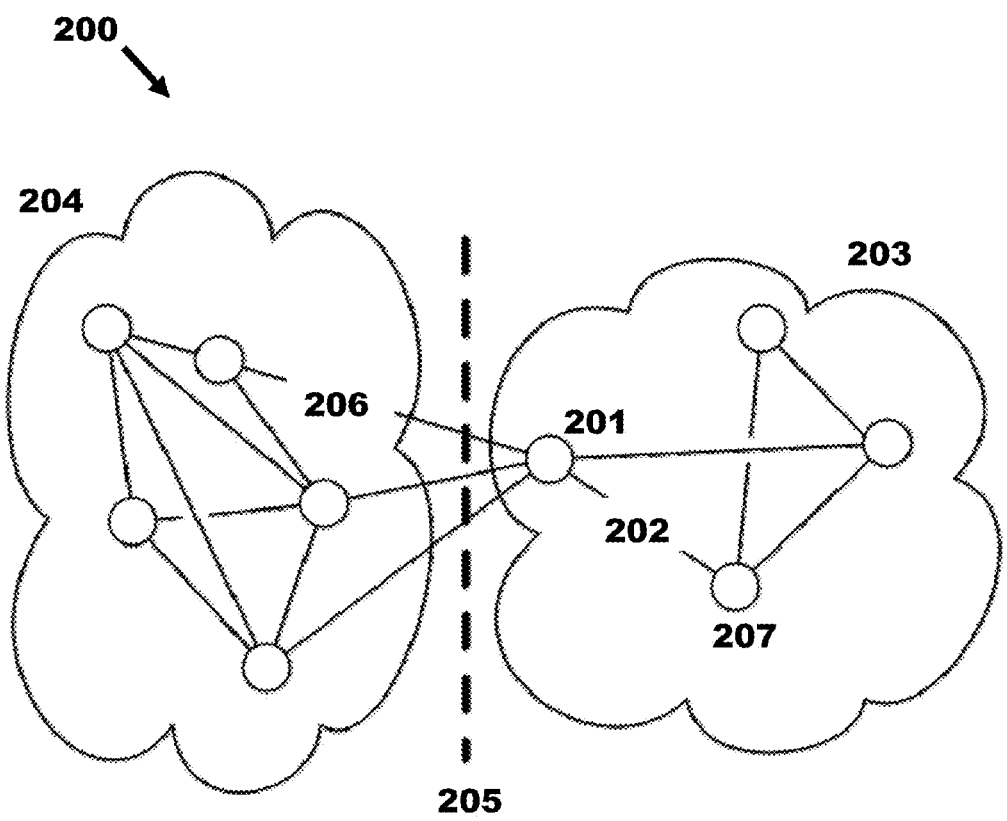
FIG. 2 shows an illustrative example of a graphic representation of relationship between beacons.

FIG. 2 shows an illustrative example of a graphic representation of relationship between beacons. As shown in FIG. 2, in certain embodiments, beacons become the nodes 201 and relationships become the edges 202 in a Beacon Graph 200. This is particularly useful in propagating attributes between connected beacons, where two beacons are considered to be connected if there is a (possibly hop-limited) path between the two beacons formed by traversing the edges of the graph. For instance, the stability of a particular beacon may be impacted by the respective stabilities of beacons to which it has relationships (referred to as neighbors) and the attributes of the relationships to those neighbors, and each neighboring beacon's stability is in turn impacted by the stabilities of its own neighbors, etc.

In addition, each graph edge 202 can be assigned a weight based on the attributes of the corresponding relationship and the connected nodes. The weight relates to the likelihood that the edge accurately represents the current beacon geometry, and the weights can be used to generate a weighted distance between two nodes or an aggregate weight of edges crossing a partition 205 of the graph. In other words, the weights assigned to edges reflect the degree to which connected nodes affirm or contradict one another's attributes, so a strong edge connecting two beacons with contradictory attributes indicates that one or both beacons are likely to have incorrect attributes. By extension, a path traversing multiple strong edges can be used to find affirmation or contradiction between beacons even if they are not directly connected. For example, if two beacons whose attributes indicate that they are located many thousands of miles apart are connected by a few strong edges of a beacon graph, we can infer that one or both beacons may be incorrectly positioned.

Edge weights can be functions of any relationship attributes or attributes of related beacons. For example, the weight of an edge could be determined by the number of separate observations of the corresponding relationship as well as the time since the last observation of the relationship (Quiet Time) and the estimated distance between the connected beacons.

The Beacon Graphs defined under certain aspects of this invention facilitate the use of tools from the field of graph theory that will be familiar to those having ordinary skill in the art. For instance, Dijkstra's Algorithm finds the minimum cost path between two nodes in a weighted, directed graph, and variations on the Ford-Fulkerson Algorithm can be used to quantify the weights of graph edges crossing a partition.

Referring to FIG. 2, node 201 is a member of cluster 203, which is separated from cluster 204 by partition 205. As addressed in some of the examples that follow, the fact that node 201 is connected to nodes in both clusters can be an indicator of pathology.

Note that the Beacon Graphs defined by some embodiments can have an unlimited number of directed or undirected edges between adjacent beacons and that beacons need not be similar to be related and occupy the same graph. For instance, WiMax (IEEE 802.16), UMTS, and Wi-Fi (IEEE 802.11) beacons could be related and placed in the same graph.

Beacon Pathologies

In simple terms, certain embodiments declare that a beacon is stable if it can only be observed within a single coverage area, where the allowable size of a coverage area depends on the details of the standards by which the beacon is governed. For the example of Wi-Fi (IEEE 802.11) access points, a reasonable coverage area would have a radius of several hundred meters.

There are several mechanisms through which a beacon can be rendered unstable, meaning that it can be or has been observed in multiple distinct coverage areas. Broadly, certain embodiments divide the pathologies into the following categories: relocation, mobility, ubiquity, and excess range. Each of the pathologies is defined below.

The scope of the invention includes taking particular actions upon identifying a beacon as likely exhibiting one or more pathologies. For example, the beacon can be ignored by a positioning algorithm; the beacon can be associated with an identifier of the pathology in a database, a report of beacons having likelihoods of exhibiting pathologies can be created, etc. Moreover, no specific action needs to be taken at all, as merely determining likelihoods of beacons exhibiting one or more pathologies are within the scope of the invention.

Relocation

Figure 3:
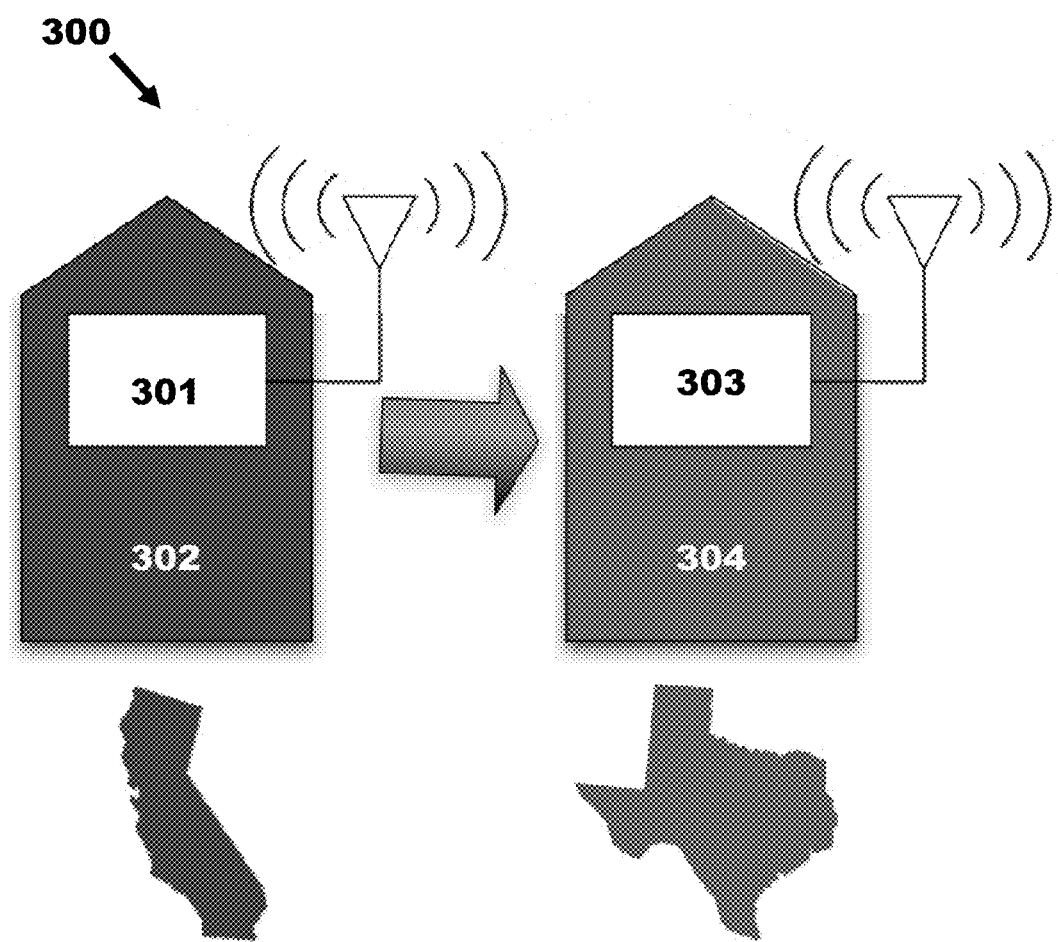
FIG. 3 illustrates the concept of a beacon moving from one location to another.

FIG. 3 illustrates the concept of a beacon moving from one location to another. Certain embodiments declare that a beacon 301 exhibits relocation 300 when it is moved from one fixed location 302 to another 304. If left uncorrected, relocation can cause the positioning system to position users at the beacon's previous location 302 when they are actually at the beacon's new location 304. Relocation is often further obscured by the fact that multiple beacons may relocate together.

Relocations are further subdivided into two types: infrequent and frequent. Infrequent relocations occur as often as several times per year as individuals or organizations relocate permanently or semi-permanently along with their beacons. For example, college students moving to and from campus give rise to many infrequently relocated beacons. Frequent relocations occur as often as several times per month. For example, frequently relocated beacons might be moved with a touring performance ensemble or an emergency response unit.

Mobility

Certain embodiments declare beacons to be mobile if they transmit while being carried with a user or transported in a vehicle. Mobile beacons often appear in a large number of locations in quick succession, so they can degrade user-positioning performance over large areas and for large numbers of users.

Mobile beacons fall into the following categories: vehicular, personal, and asset.

Vehicular beacons are further subdivided into transit, professional, and individual vehicular beacons. Transit beacons are permanently or semi-permanently installed in buses, trains, boats, planes, or other vehicles that follow predictable routes.

Professional vehicular beacons are installed in commercial or industrial vehicles. For instance, beacons installed in limousines, taxis, delivery trucks or other vehicles that follow unpredictable routes would be considered professional vehicular beacons. Individual vehicular beacons are permanently or semi-permanently installed in automobiles, vans, trucks, or other personal vehicles that do not adhere to any predictable routes.

Personal beacons are divided into portable and ad-hoc types. Portable beacons are dedicated beacon devices that are carried by individuals, and, though they may be used in vehicles, are not permanently installed in any vehicle. Such devices are often referred to as Personal Hotspots or Mobile Routers. Ad-hoc personal beacons are client devices such as notebook computers or cellular telephones that are capable of acting as beacons under certain configurations. One popular application of ad-hoc beacons is to "tether" a mobile telephone to another client device using Wi-Fi or Bluetooth in order to give the second device access to the cellular data network. In this example, the mobile telephone acts as the ad-hoc beacon.

Asset beacons are beacons that are installed in or transported with goods or other cargo. For instance, palletized cargo or shipping containers can contain beacons for use in inventory and tracking.

Ubiquity

Certain embodiments declare beacons to be ubiquitous if they have identifiers that are duplicated by other beacons and/or possess other attributes that render them difficult or impossible to distinguish from one another. That is, whereas non-ubiquitous beacons have globally unique identifiers, ubiquitous beacons do not have any globally unique identifiers. The result is that a ubiquitous beacon can appear to be in multiple locations at the same time. Ubiquity is distinct from relocation and mobility because it does not require that a beacon be physically moved from one location to another, and Ubiquity is exhibited by an ensemble of beacons rather than a single pathological beacon.

Ubiquitous beacons fall into the following categories: factory duplicated, reprogrammed, and dynamic. Factory duplicated beacons are devices whose manufacturer has intentionally or inadvertently given the same identifier to multiple devices. Reprogrammed beacons are devices that have been reprogrammed to intentionally or unintentionally duplicate the identifiers of other devices. Dynamic beacons are devices whose identifiers change over long or short time scales and intentionally or unintentionally duplicate the identifiers of other devices. Dynamic ubiquitous beacons are particularly common in some enterprise Wi-Fi deployments in which identifiers are assigned by a central controller and passed from beacon to beacon in order to give the appearance of seamless connectivity to the client device.

Excess Range

Figure 4:
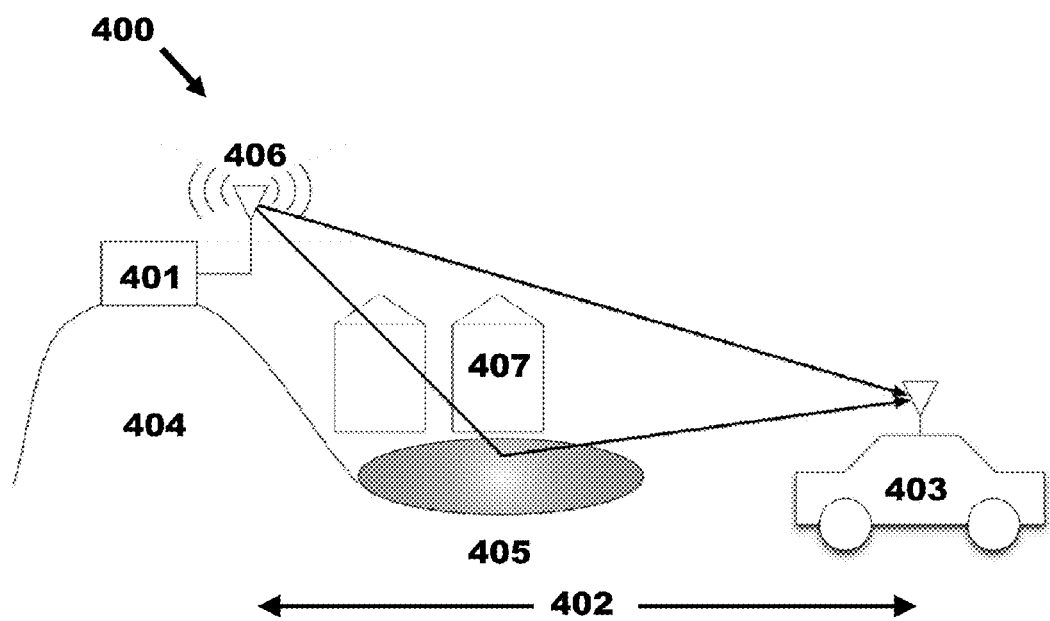
FIG. 4 illustrates the concept of a beacon having Excess Range.

FIG. 4 illustrates the concept of a beacon having Excess Range. Certain embodiments declare a beacon 401 to have Excess Range if it is observable over an area that significantly exceeds the coverage areas of typical beacons of the same type. For example, a typical 802.11 beacon has a coverage radius 402 on the order of 100 meters. An 802.11 beacon with Excess Range could have a coverage radius 402 on the order of 1000 meters. Like Ubiquity, Excess Range does not require that the pathological beacon be moved from one place to another, but unlike Ubiquity, Excess Range is a property of a single beacon and is based entirely on the physical characteristics of the beacon and its environment.

Certain embodiments declare a beacon to have Excess Range in response to a number of mechanisms including device configurations and environmental factors. Features such as nonstandard hardware 406 (e.g., high gain directional antennas) and firmware/software (e.g., selecting unusually high transmit power) often lead to Excess Range. Similarly, beacons installed at high altitude 404 or near large open areas can often be detected at ranges that exceed typical transmission distances.

Beacons exhibiting Excess Range fall into the following categories: environmental, configuration, and network.

Environmental Excess Range beacons include those installed or placed on a natural (e.g., mountain 404) or man-made structure (e.g., tower) that affords an unobstructed path to distant locations by virtue of its height. Other mechanisms for environmental Excess Range include planar effects such as water bounce and waveguides. Water bounce 405 is a phenomenon in which signals from a beacon are strongly reflected by the surface of a body of water. Waveguide effects arise from parallel reflecting surfaces such as "Urban Canyons" formed by tall buildings on either side of a street. Waveguides have the effect of focusing signal energy along the axis of the waveguide and extending the effective range of the signal.

Configuration-based Excess Range beacons are detected at unusually large distances due to special hardware or software. Such configurations can be as simple as setting the maximum transmit power used by the beacon to an unusually high level. Excess range can also arise from antenna choices. Directional antennas (e.g., parabolic dishes) achieve increased range in one or more directions by narrowing the pattern of the signal in azimuth and/or elevation. High-gain omnidirectional antennas achieve increased range in a particular plane by narrowing the signal pattern in elevation.

Network-based Excess Range beacons use multiple transmitting devices to extend transmission range. Relay devices such as range extenders receive beacon signals and then rebroadcast them, essentially re-amplifying the signals so that they can be received at distances beyond the reception range of the original signals. Mesh networks consist of networks of cooperating beacons in which transmissions may travel through the air between beacons over multiple hops and may give the appearance of Excess Range for one or more beacons in the network.

Pathology Functions

Those having ordinary skill in the art will be familiar with the concept of hard and soft decisions related to the detection of a certain binary event. In certain embodiments, a beacon is declared to either exhibit or not exhibit a given pathology with either a hard or soft decision. In embodiments utilizing a hard decision, the beacon is identified as being definitely pathological or definitely not pathological. Embodiments utilizing a soft decision assign a value (e.g., between 0 and 1, a relative score, etc.) to the probability that the beacon is actually pathological. Any soft decision probability value can be converted to a hard decision by thresholding the pathology probability and rounding values above the threshold to the upper bound value (e.g., 1) and values less than or equal to the threshold to the lower bound value (e.g., 0).

Moreover, although the term "probability" often has a specific mathematical meaning as understood by one having ordinary skill in the art, the techniques set forth herein are also applicable to finding a probability-like score, value, or measure of the likelihood of a beacon either exhibiting or not exhibiting a given pathology. In addition, relative measures of pathologies can be determined using the techniques described here. Such relative measures represent the likelihood that a beacon is exhibiting a given pathology relative to another one or more beacons. Thus, although the general description and specific techniques disclosed herein recite results in terms of a "probability", is it understood that other values, scores, or measures of the likelihood of a pathology is encompassed in this description.

Because the different pathologies can arise independently in the same beacon, certain embodiments detect each pathology on its own. After the individual pathology decisions have been made, any combination of the decisions for the various pathologies can be used to create the aggregate stability value of the beacon.

The expression $P(X|\{A_i\})$ represents the probability that a beacon exhibits pathology X given that the beacon has the set of attributes $\{A_i\}$. $P(X)$ is the a priori probability of pathology X over the entire population of beacons, and $P(\{A_i\})$ is the probability of the particular n-tuple of attributes over a large collection of beacons. The attribute set used to determine the probability of each pathology can be any subset up to and including the full set of attributes of the beacon itself and the attributes of any relationships and connected beacons. In addition, functions of beacon and relationship attributes can themselves be treated as attributes. Each individual probability expression and threshold value used in the functions that follow can be derived theoretically or from empirical data using standard techniques that will be familiar to those having ordinary skill in the art.

In the pathology probability expressions used in the examples that follow, the sets of attributes have been reduced for the sake of clarity. In practice, it is often advantageous to reduce the set of attributes either by ignoring certain attributes that are not relevant to the particular pathology or using functions that combine multiple attributes into a single parameter. However, in some implementations, additional attributes remain in the expressions.

General Hard Decision

Certain embodiments generate a hard decision by applying thresholds to one or more attributes and using binary logic to combine the different attribute values into a single binary decision variable. Such hard decision functions are of the following form.

$$((A_1 > b_1) \& (A_2 > b_2) \& \ldots \& (A_n > b_n)) | ((A_1 > c_1) \& (A_2 > c_2) \& \ldots \& (A_n > c_n)) | \ldots$$

Alternatively, certain other embodiments use probability functions to create a likelihood ratio, and that ratio can be compared to a threshold to produce a hard decision. Specifically the likelihood ratio test compares the probability of two complementary hypotheses: the beacon is pathological, the beacon is not pathological (which is the same as 1 minus the probability that the beacon is pathological). In the following general function, the ratio on the left exceeds threshold T when pathology X is sufficiently probable, and the beacon is declared pathological.

$$\frac{P(X | \{A_i\})}{1 - P(X | \{A_i\})} > T$$

General Soft Decision

Certain embodiments assign the probability that a beacon exhibits a particular pathology using techniques tailored to the specific characteristics of each of the pathologies. In the methods that follow, the individual pathology probabilities take the following form based on the well-known Bayes' Rule.

$$P(X | \{A_i\}) = \frac{P(\{A_i\} | X) P(X)}{P(\{A_i\})}$$

Recall once again that the individual probability functions can be derived either from well-known theoretical results or empirical data by those having ordinary skill in the art. For example, in certain implementations, a particular set of beacons may be known or strongly suspected of exhibiting a known pathology; the attributes of these beacons and/or the attributes of their relationships to other beacons can then be correlated with the known or suspected pathology.

EXAMPLES

The following illustrative examples demonstrate how the pathologies defined by illustrative implementations of this invention can be detected using the attributes of beacons, relationships, scans, and submissions. In general, the scope of the invention includes all possible techniques used to make either soft or hard decisions on the presence of the pathologies based on the set of attributes as defined herein. These examples are provided in order to better explain how such techniques might work. The examples should not be construed as an exhaustive set of all techniques covered by the invention, and they can be combined and extended without limit to construct compound pathology detection techniques.

The examples that follow recite various threshold values. Thresholds are typically selected to meet performance goals for the detection system as quantified by two metrics well-known in the art: false alarm probability and miss probability. In this case, the false alarm probability is the likelihood that the detector will mistakenly identify a beacon as pathological when in fact it is not. The miss probability is the likelihood that a pathological beacon will not be identified as pathological. Intuitively, an effective pathology detector should minimize both the false alarm and miss probabilities. However, in any non-trivial application, it will be impossible to achieve both a false alarm and a miss probability of zero, and adjusting thresholds to decrease one probability will often increase the other. A standard practice is to select the maximum allowable false alarm probability and then adjust thresholds to minimize miss probability while still remaining at or below the maximum false alarm probability. Overall, the selection of threshold values will be an application-dependent design decision and can be performed through theoretical analysis or empirical testing.

Relocation

Example 1

Figure 5:
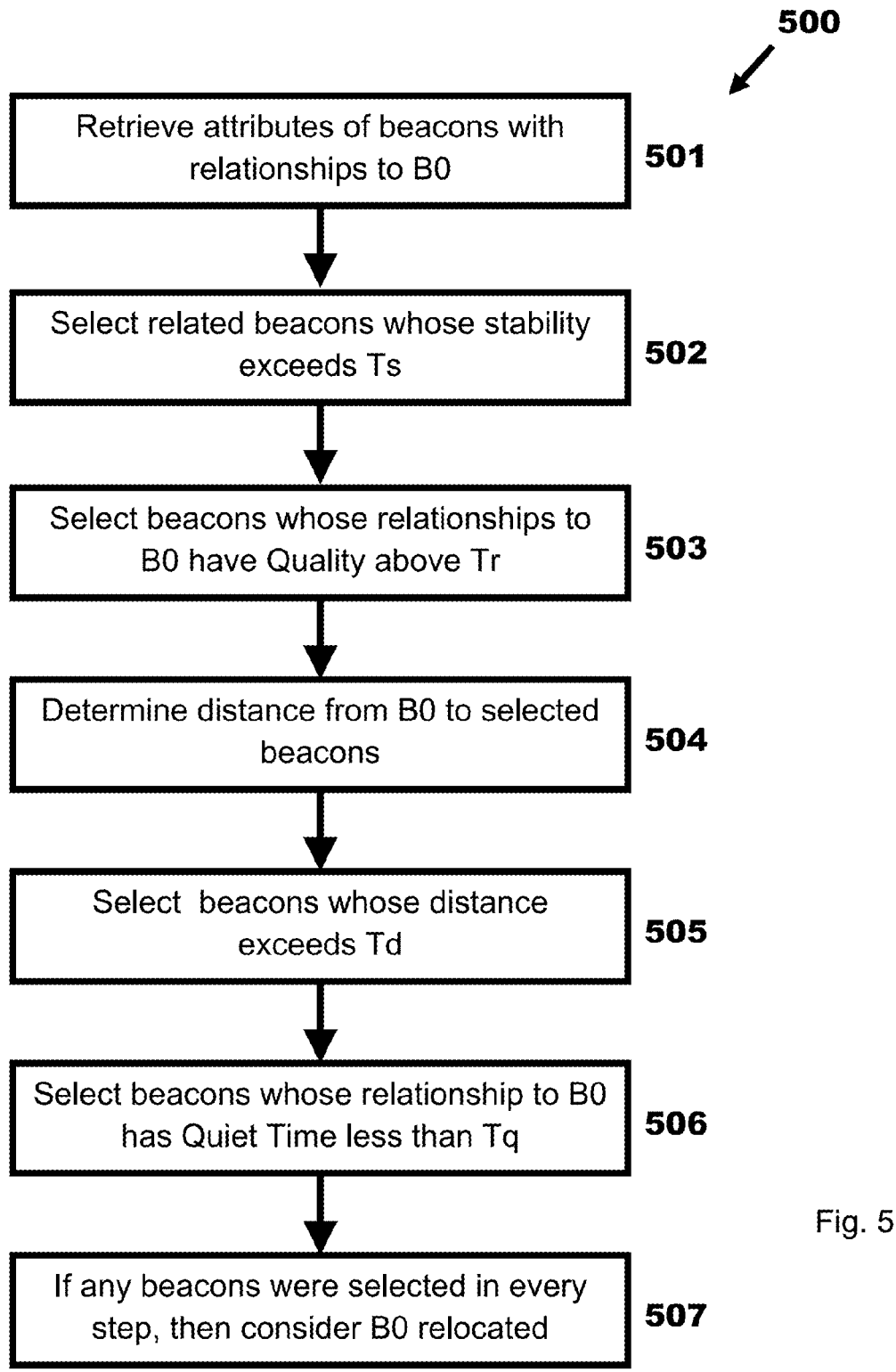
FIG. 5 shows a method for detecting a beacon relocation.

FIG. 5 shows a method for detecting a beacon relocation. In one embodiment, relocation of a beacon B0 is detected by a method 500. Method 500 includes retrieving the attributes of beacons with relationships to beacon B0 (neighboring beacons) and the attributes of those relationships (step 501). Next, a subset of neighboring beacons whose stability value exceeds some threshold Ts (e.g., 0.99) is assembled (step 502) and whose relationship to beacon B0 has Quality (which, for example, can be based on the Quiet Time, estimated distance spanned, and number of observations of the relationship) exceeding some threshold Tr (step 503).

Note that stable neighbors may come from different protocols. That is, some or all of an 802.11 beacon's stable neighbors may be UMTS cellular beacons. The stability of the neighboring beacons can be determined using any combination of the techniques set forth herein or the combination of techniques set forth herein and side information from external sources (e.g. confirmation of municipal beacon locations from a city's public works department). Example stability functions are given in a subsequent section of the document.

Next, the method determines the set of distances, {D}, from the estimated position of beacon B0 to the estimated positions of each of its stable neighbors (where the estimated positions are stored in the attributes of each beacon) (step 504). The method then compares each distance in set {D} to a threshold, Td, and selects beacons whose distance exceeds Td (step 505). The value of Td is determined based on a typical transmission range of the beacons. In other words, Td captures a distance beyond which two correctly positioned (i.e., having correct known beacon locations) beacons should not be simultaneously observable. Next, beacons are selected whose relationship to beacon B0 has a Quiet Time less than some threshold Tq (e.g. 7 days) (step 506). Finally, the method declares beacon B0 to be relocated if any one or more of the same beacons were selected in steps 505 and 506.

Example 2

Figure 6:
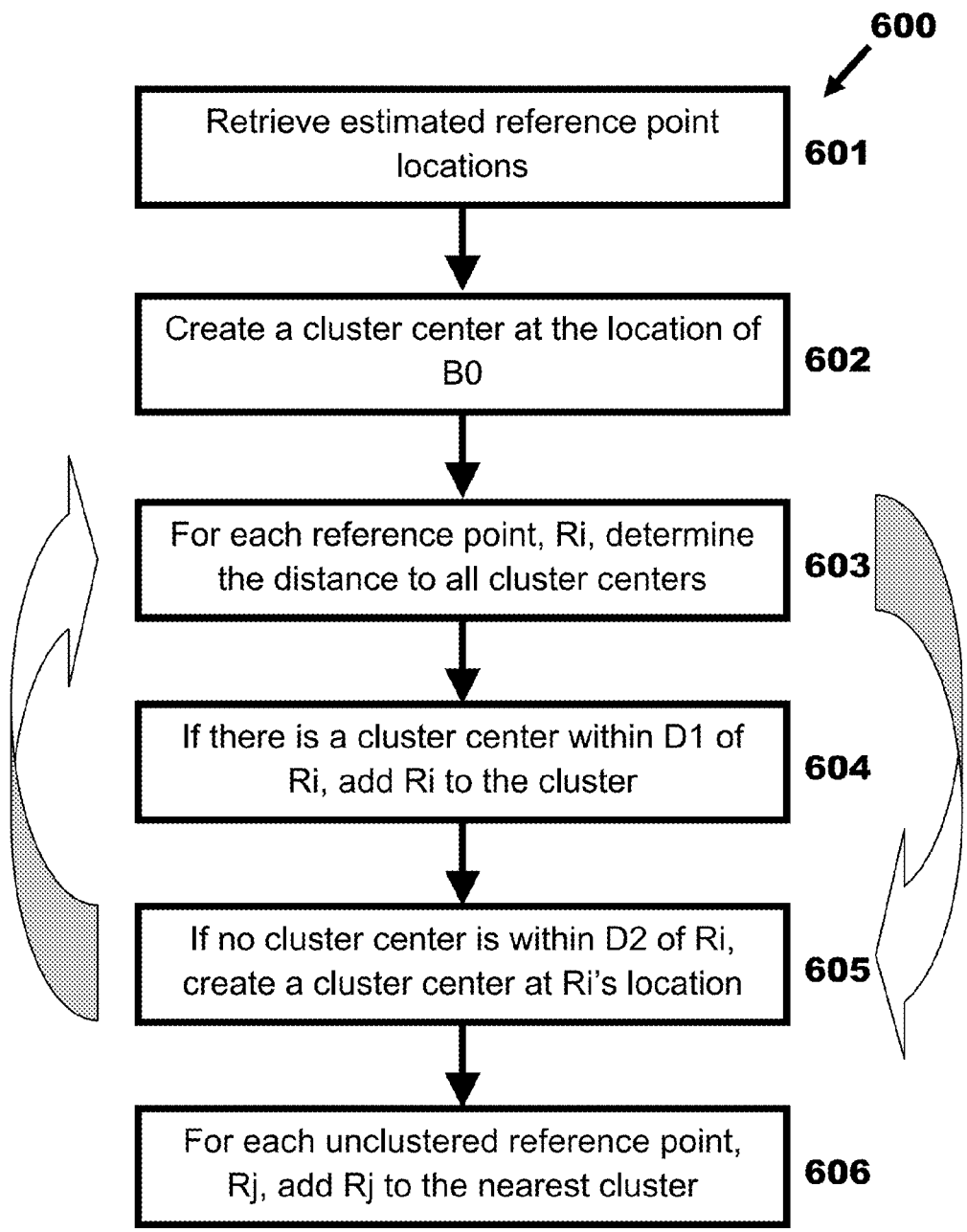
FIG. 6 shows a method for spatially clustering beacons.
Figure 7:
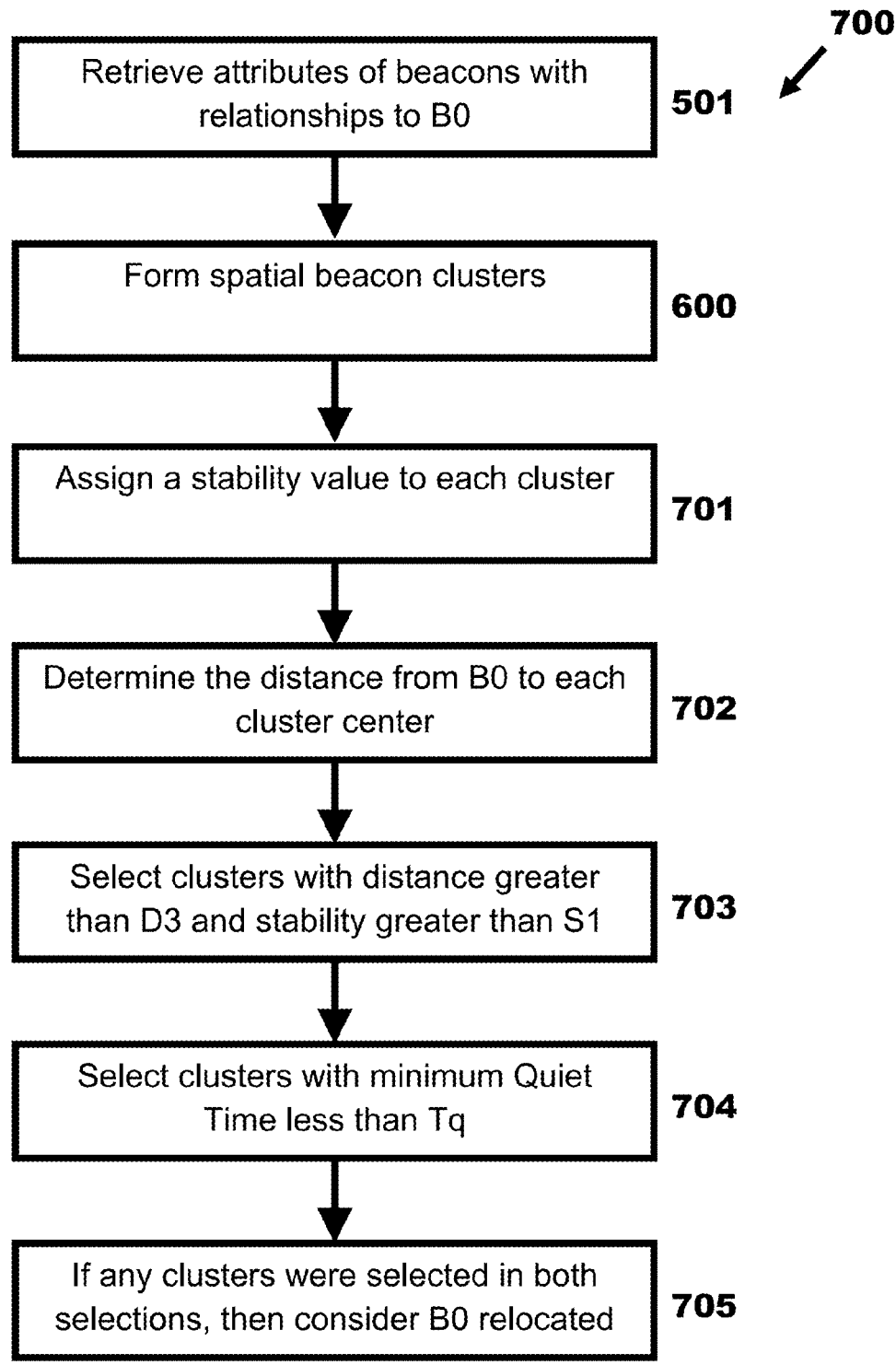
FIG. 7 shows a further method of detecting a beacon relocation.

Another implementation for detecting a beacon relocation is now presented. In this implementation, neighboring beacons are spatially clustered according to a method 600 shown in FIG. 6, while FIG. 7 shows a further method 700 of detecting a beacon relocation of beacon B1 . First, attributes of beacons with relationships to beacon B0 are retrieved (step 501). Then, the neighboring beacons (which serve as the reference points in this example) are spatially clustered according to method 600 of FIG. 6.

According to method 600, estimated locations for each beacon related to B0 are retrieved (step 601), and an initial Cluster Center is designated at the estimated location of beacon B0 (step 602). Then, for each of the neighboring beacons, Bi, the clustering method 600 determines the distance to existing cluster centers (step 603). If there is a cluster center within distance D1 (e.g., 1 km) of beacon Bi then beacon Bi is added to that cluster (step 604). In certain implementations, the value of distance D1 is related to and/or determined, in part, by the typical coverage area of beacons of the same type as beacon Bi. If no cluster center is within distance D2 (e.g., 2 km) of beacon Bi, then a new cluster center is created at the location of beacon Bi (step 605). In certain implementations, the value of distance D2 is determined, in part, by the amount of distance that makes it likely, above a certain threshold, that beacon B0 has relocated.

After creating the cluster centers, there should be no two cluster centers within distance D2 of one another, and no cluster should have any beacons whose distance is greater than distance D1 from the cluster center. Next, the clustering method addresses any beacons that have not yet been added to a cluster and adds them to the nearest cluster (step 606).

After completing spatial clustering method 600, a stability value is assigned to each cluster (step 701) based on the stability of each member of the cluster and/or the number of beacons in the cluster. For example, the cluster is assigned to have the same stability as the maximum beacon stability in the cluster. Then the method determines the distance from each cluster center to beacon B0 (step 702). Clusters with distance greater than distance D3 (e.g., 2 km) from beacon B0 and having stability greater than stability S1 are selected (step 703). In certain implementations, the value of distance D3 is determined, in part, by the amount of distance that makes it likely, above a certain threshold, that beacon B0 has relocated. From the set of selected clusters, the method selects clusters with a minimum Quiet Time less than time Tq (e.g., 30 days) (step 704). If any clusters satisfied all three criteria: distance greater than distance D3, stability greater than stability S1, and Quiet Time less than time Tq, then the method declares beacon B0 to be relocated (step 705).

Example 3

Figure 8:
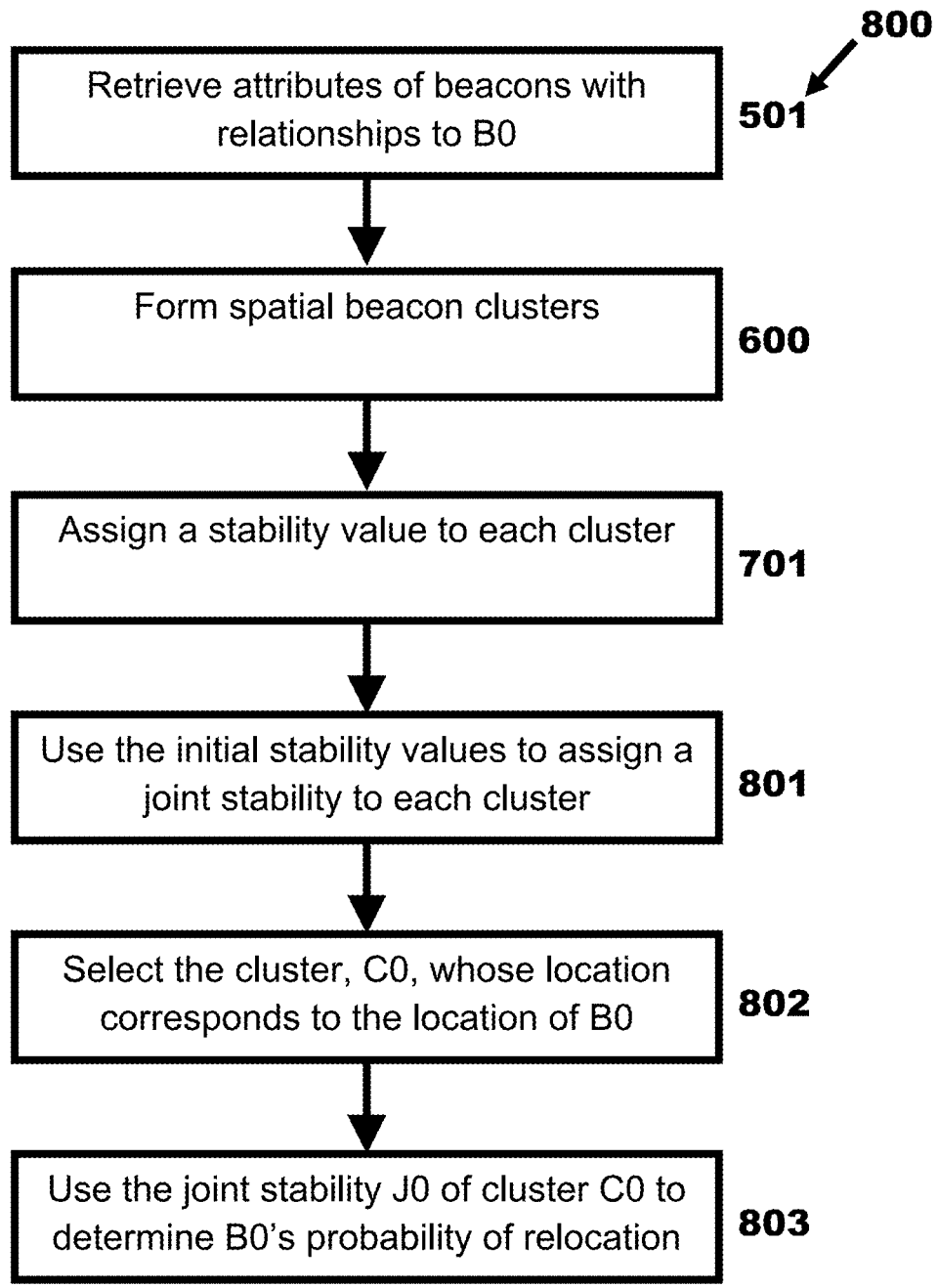
FIG. 8 shows yet another method of detecting a beacon relocation.

FIG. 8 shows yet another method 800 of detecting a beacon relocation. First, attributes of beacons with relationships to beacon B0 are retrieved (step 501). Then the method spatially clusters the neighboring beacons, using method 600, described above. After completing spatial clustering 600, an initial stability value, Si, is assigned to each cluster Ci based on the number of neighbors in the cluster and the quiet time of the cluster (step 701). The number of neighbors in the cluster is related to the probability that the cluster has relocated as a unit, and the quiet time of the cluster is related to the probability that B0 has relocated away from the cluster. The initial stability values can be generated based on empirical observations or analytical expressions representing the probability that a cluster is providing valid information about a related node as a function of cluster size and quiet time.

Next, the initial stability values, Si, is used to create joint stability values, Ji, for each cluster (step 801). The joint stability values quantify the fact that only one cluster can correctly reflect B0's current position, so the existence of multiple clusters creates conflicting information about B0's true location. For example, in one implementation, joint stability values are created by normalizing the initial stability values such that the joint stability values sum to 1, see the following equation.

$$J_i = \frac{S_i}{\sum S_n}$$

In another implementation, the joint stability values are created according to the following expression, which enforces the mutual exclusivity of clusters while remaining upper bounded such that joint stability Ji never exceeds initial stability Si.

$$J_i = S_i \prod_{k \neq i} (1 - S_k)$$

After generating joint stability values, Ji, for the clusters, the method determines which cluster, C0, corresponds to B0's estimated location (step 802), and uses C0's joint stability value, J0, to assign B0's probability of relocation (step 803). In other words, J0 is closely related to the probability that beacon B0 has been relocated. Thus, in some implementations, it may be sufficient to set the probability of location equal to J0 directly, though other applications may require additional scaling or offsets to return a satisfactory probability of relocation. Also note that the probability of relocation can be determined while B0's position is being estimated, and the position estimate can be selected such that the probability of relocation is minimized. In other words, the system can determine multiple candidate positions and then compare their respective relocation probabilities to decide which position is most likely to be correct.

Example 4

Figure 9:
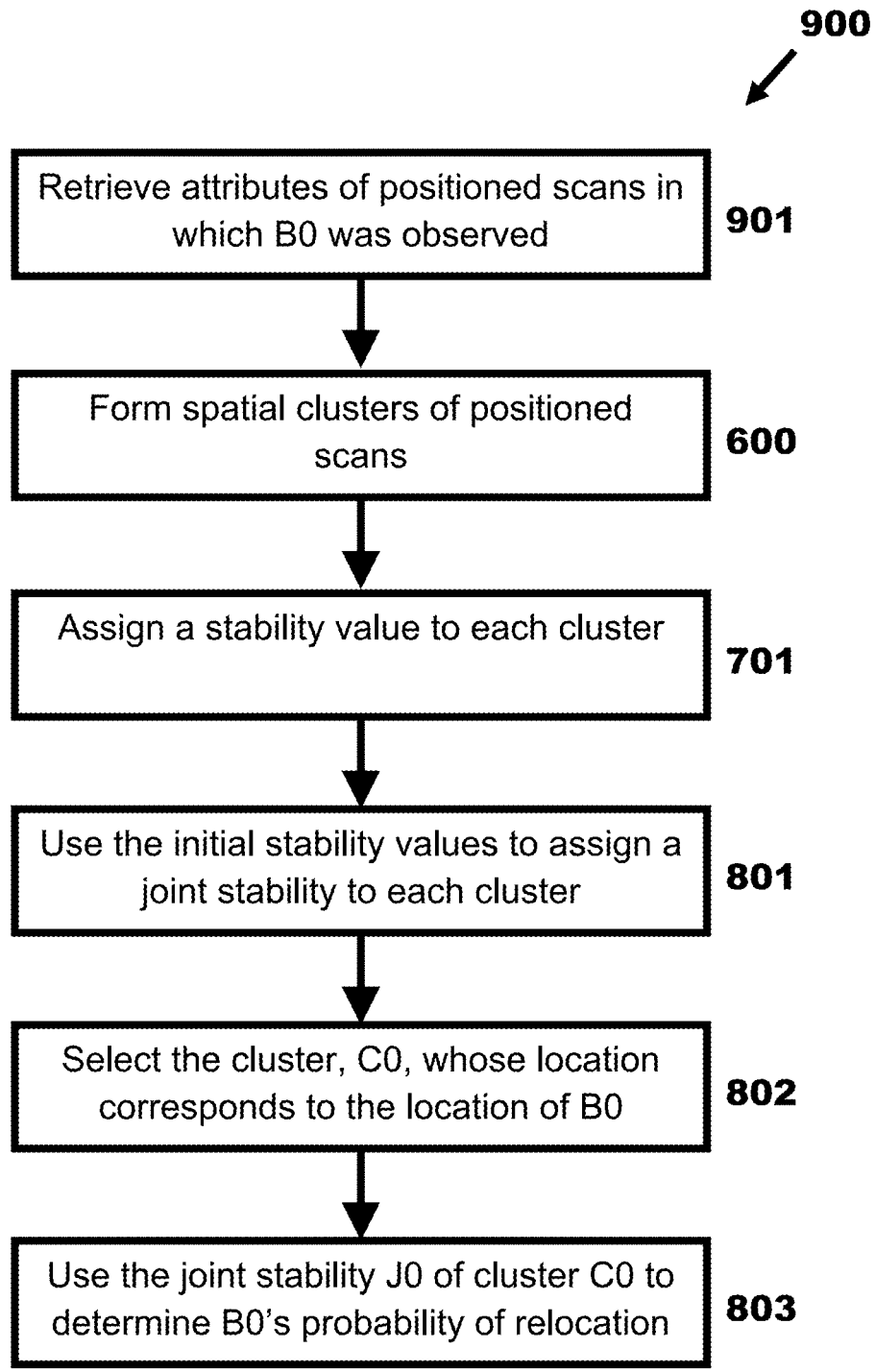
FIG. 9 shows still a further method of detecting a beacon relocation.

FIG. 9 shows still a further method 900 for detecting a beacon relocation. In this implementation, positioned scans take the place of the neighboring beacons that were used as reference points in method 800. The specific stability functions could take different forms when using scans instead of neighboring beacons, but the functional blocks are nearly identical, and, thus, the same reference numerals are used. First, the attributes of positioned scans in which beacon B0 was observed are retrieved (step 901). Next, the method spatially clusters the positioned scans according to method 600, described above, and assigns an initial stability value to each cluster as described above in connection with step 701.

Method 900 next uses the set of initial stability values to generate a joint stability value for each cluster of scans 801. After generating joint stability values for the clusters, which cluster corresponds to B0's estimated location is determined (step 802). Finally, the joint stability value of the cluster of scans closest to the estimated location of beacon B0 is used to determine the probability that B0 has relocated (step 803).

Example 5

Figure 10:
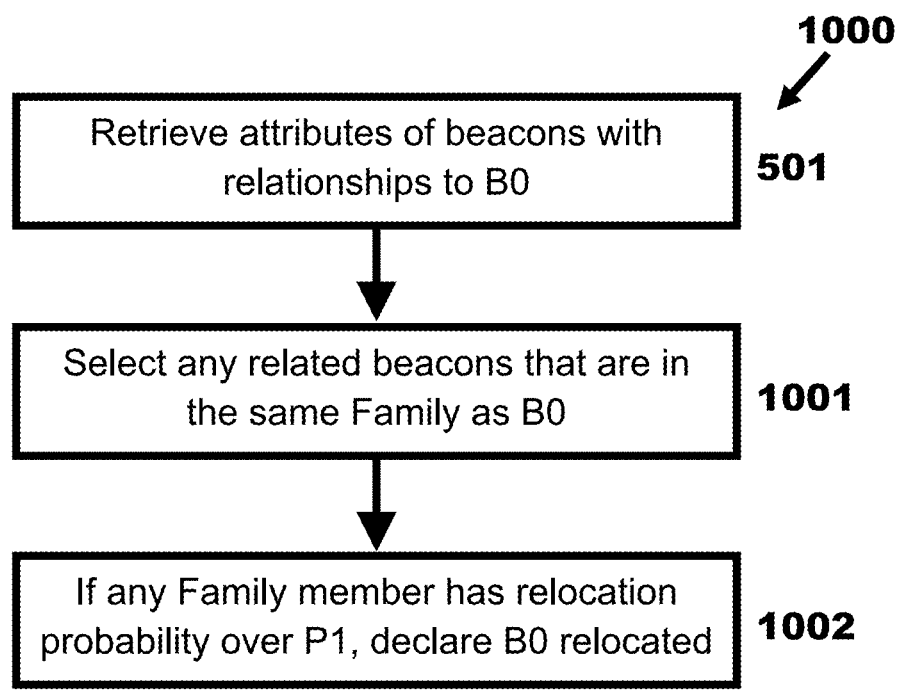
FIG. 10 shows another method of detecting a beacon relocation.

FIG. 10 shows another method 1000 of detecting a beacon relocation. The method begins by retrieving the attributes of beacons with relationships to beacon B0 (step 501). Then the method selects any of the neighboring beacons that belong to the same family as beacon B0 (located in the same hardware or owned by the same individual or entity and expected to relocate together) (step 1001). If any member of beacon B0's family has a relocation probability above probability P1, then beacon B0 is declared to be relocated 1002.

Example 6

Figure 11:
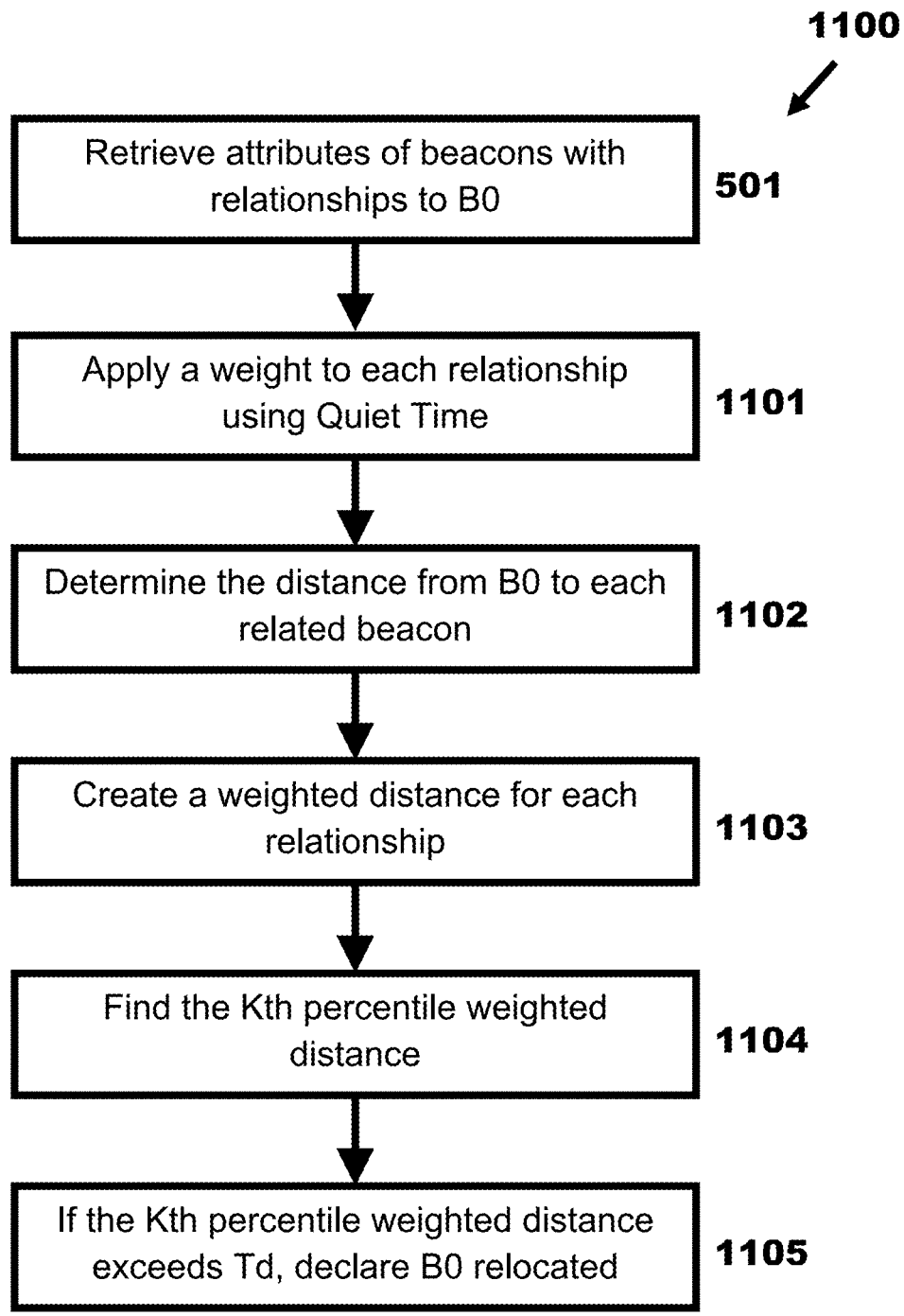
FIG. 11 shows yet another method of detecting a beacon relocation.

FIG. 11 shows yet another method 1100 of detecting a beacon relocation. The method begins by retrieving the attributes of beacons with relationship to beacon B0 and the attributes of those relationships (step 501). Using a function of the Quiet Time of each relationship, a weight is applied such that relationships with small Quiet Times receive a larger weight than relationships with large Quiet Times (step 1101). Next, the method determines the distance from beacon B0's estimated location to each of the estimated locations of beacon B0's neighbors (step 1102). Then, each distance is combined with its corresponding weight to create a weighted distance value for each relationship (step 1103). From the set of weighted distance values, the Kth percentile (e.g., K=90) weighted distance is found (step 1104). Using techniques familiar to those having ordinary skill in the art, the Kth percentile can be found by arranging the weighted distance values in ascending order and selecting the value whose index equals ceil(0.9*L) where "ceil" represents the ceiling function—rounding up to the next integer—and L is the number of values in the list.

Finally, if the Kth percentile weighted distance exceeds some threshold Td, then the method declares that beacon B0 is relocated (step 1105). A large Kth percentile weighted distance indicates that beacon B0 has a large proportion of relationships that connect beacon B0 to beacons that are positioned far away from beacon B0's current estimated position. In turn, relationships to large numbers of apparently distant beacons suggest that beacon B0 no longer resides at its estimated position. Combined with the fact that relationships with smaller Quiet Times (more recently observed) receive higher weights, a large Kth percentile weighted distance means that not only was beacon B0 observed with a substantial number of neighbors far from beacon B0's current estimated position, but the observations were relatively recent, and beacon B0 was likely relocated.

Example 7

Figure 12:
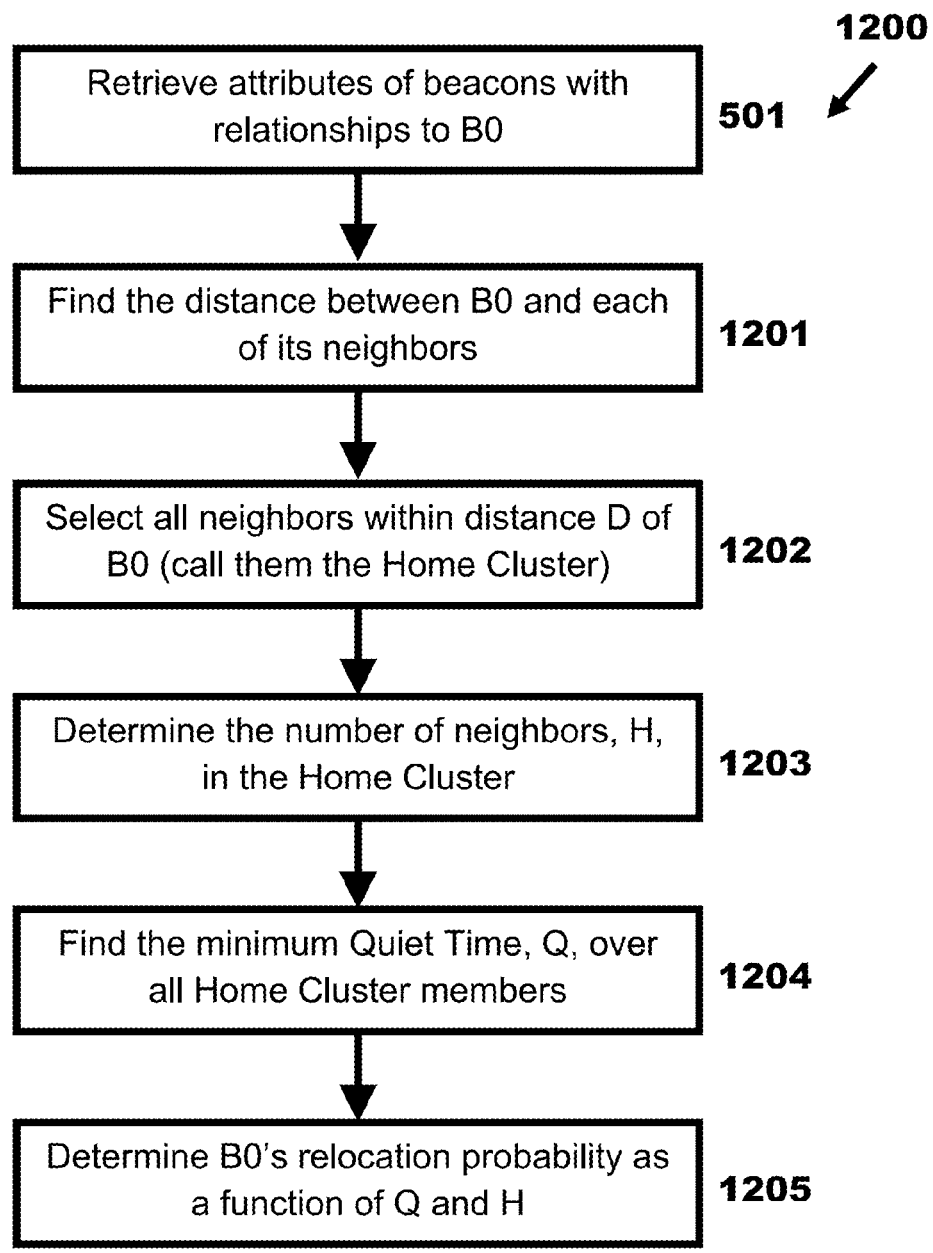
FIG. 12 shows a method of detecting a beacon relocation.
Figure 13:
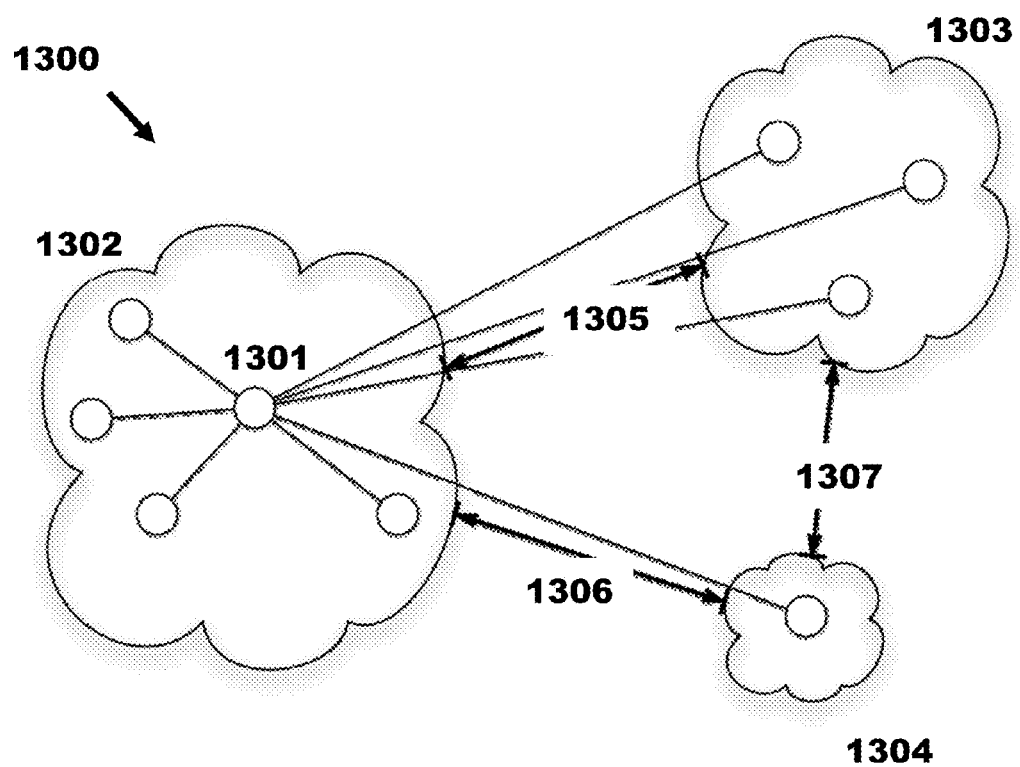
FIG. 13 illustrates a clustering technique for beacons.

FIG. 12 shows a further method 1200 of detecting a beacon relocation. FIG. 13 illustrates clustering techniques used by method 1200 to detect a beacon relocation. The method begins by retrieving the attributes of beacon B0's relationships and the nodes to which beacon B0 is related (step 501). Next, using the estimated positions of beacon B0 and each of its neighbors, the method calls for finding the distances between beacon B0 and each neighbor (step 1201). Using the set of distances, select the set of neighboring beacons whose distance from beacon B0 (1301 of FIG. 13) is less than distance D (e.g. 2 km), and design the selected set as the Home Cluster (step 1202 and shown as 1302 in FIG. 13).

Using the attributes of the beacons in the Home Cluster 1302, the method finds the total number of beacons, H, in the Home Cluster (step 1203) and the minimum Quiet Time, Q, out of Home Cluster members (step 1204). Finally, the method uses an equation of the following form to determine the probability, P(R|H, T) that beacon B0 has been relocated (step 1205):

$$P(R \mid H, T) = \frac{P(H, T \mid R)P(R)}{P(H, T)}$$

For clarity, other clusters 1303 and 1304 are shown in FIG. 13. In addition, distances between clusters 1305, 1306, and 1307, are shown. Although FIG. 13 shows the cluster distances as between the outer reaches of the clusters 1302, 1303, and 1304, in some implementations, other distances measures can be used, e.g., distances between cluster centers.

Example 8

Figure 14:
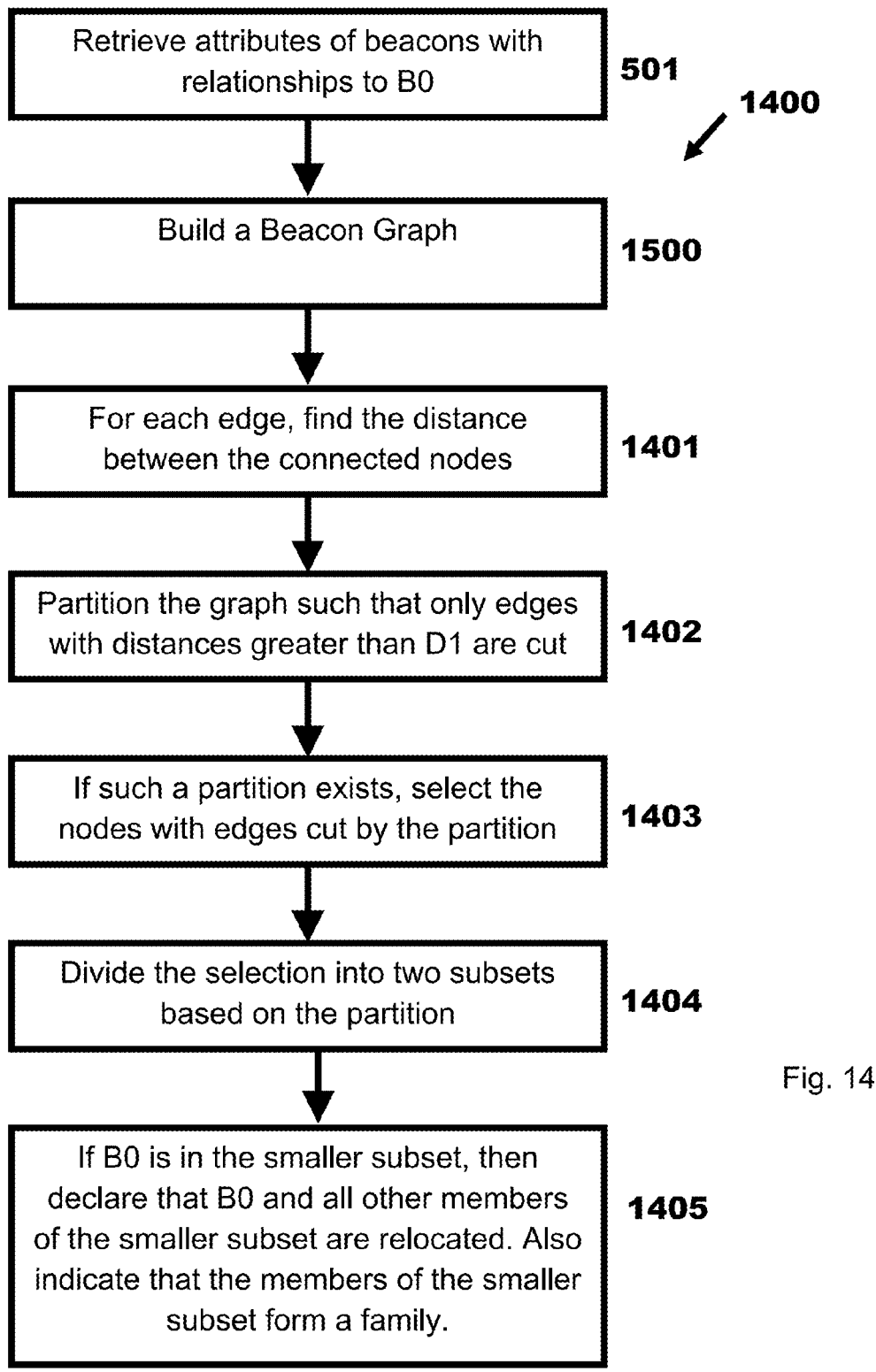
FIG. 14 shows another method of detecting a beacon relocation.
Figure 15:
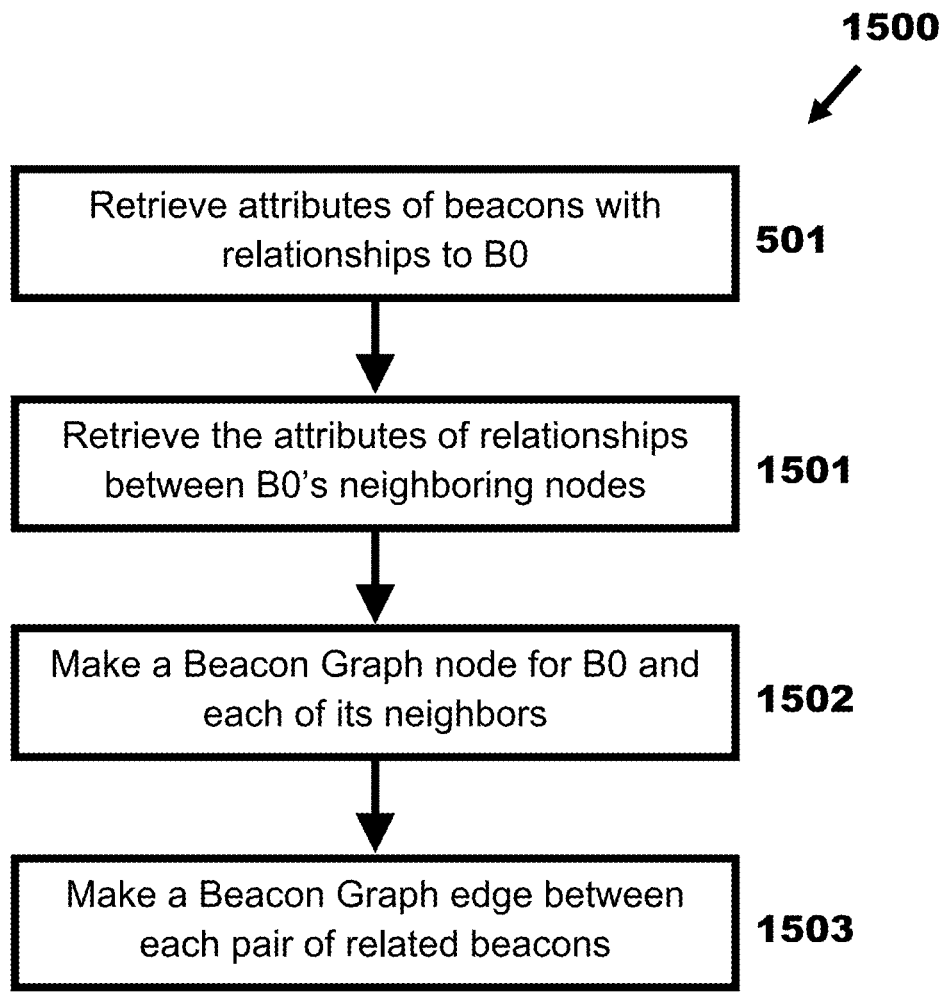
FIG. 15 shows a method of building a beacon graph.

FIG. 14 shows a further method 1400 of detecting a beacon relocation, which uses a method 1500 of building a beacon graph, as shown in FIG. 15. Reference to FIG. 2 is also made to illustrate methods 1400 and 1500. First, the method retrieves the attributes of beacons to which beacon B0 is related and the attributes of those relationships (step 501). Second, a Beacon Graph of beacon B0 (201 of FIG. 2) and its neighbors (e.g., 207) is constructed (step 1500 of FIG. 14, which is method 1500 of FIG. 15) by retrieving relationships between the neighbor beacons (step 1501). For beacon B0 and each neighbor, the method creates a node in the Beacon Graph (step 1502), and creates an edge for each relationship connecting a pair of beacons (step 1503).

Next, the set of spatial distances {Dij} between each pair of connected nodes Ni and Nj is found by using the estimated positions of the beacons Bi and Bj corresponding to those nodes (step 1401). Then the method partitions the Beacon Graph 200 into two sub-graphs 203, 204 such that the partition 205 crosses only edges 206 for which the nodes have estimated positions separated by at least distance D1 (e.g. 2 km) (step 1402). In certain implementations, the value of distance D1 is determined, in part, by the amount of distance that makes it likely, above a certain threshold, that beacon B0 has relocated. The minimum weight partition can be found using an exhaustive search or by using graph partitioning algorithms found in the literature of graph theory.

If such a partition exists, then the method next finds the node(s) 201 connected to edges 206 crossing the partition 205 (step 1403), and divides them into two subsets based on the sub-graph 203, 204 to which they belong (step 1404). The distances spanned by the edges crossing the partition are much larger than the transmission range of the beacons, so the partition indicates that nodes in one of the subsets have been relocated.

Finally, if beacon B0 is in the smaller of the two subsets, the method declares that beacon B0 and the other beacons whose nodes are in that subset to be relocated, and indicates that the beacons (if there is more than one member of the smaller subset) form a family (step 1405). As such, beacon B0 and its family members can be expected to move together in future relocation events.

Mobility

As described above, certain embodiments declare beacons to be mobile if they transmit while being carried with a user or transported in a vehicle. In other words, the beacons are determined to exhibit the pathology of Mobility.

Example 1

Figure 16:
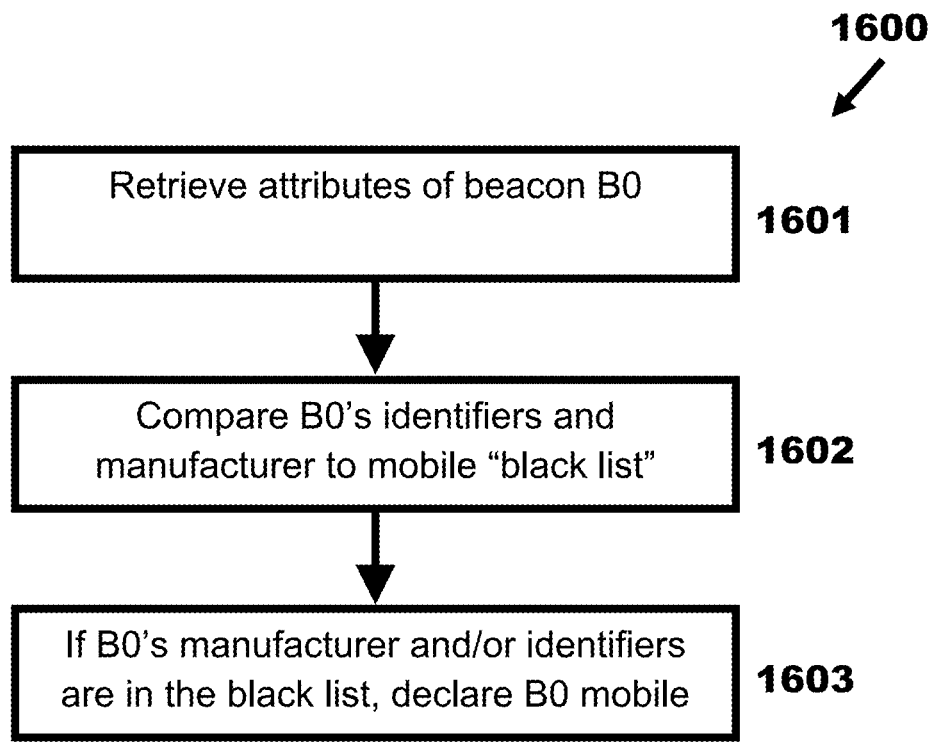
FIG. 16 shows a method of detecting a beacon exhibiting Mobility.

FIG. 16 shows a method 1600 of detecting beacon Mobility. First, the method retrieves attributes of beacon B0 (step 1601). Next, beacon B0's identifiers and manufacturer information is compared to a "black list" of manufacturers and identifiers known to correspond to mobile devices (step 1602). If beacon B0's identifiers and/or manufacturer information appear in the black list, then the method declares that beacon B0 is mobile (step 1603).

It is common practice among manufacturers to designate specific patterns of unique identifiers (e.g., MAC address ranges for 802.11 devices) for mobile and portable devices. Further, there are some manufacturers that exclusively produce mobile and portable devices, so manufacturer information alone may suffice to indicate that a given beacon is mobile.

Example 2

Figure 17:
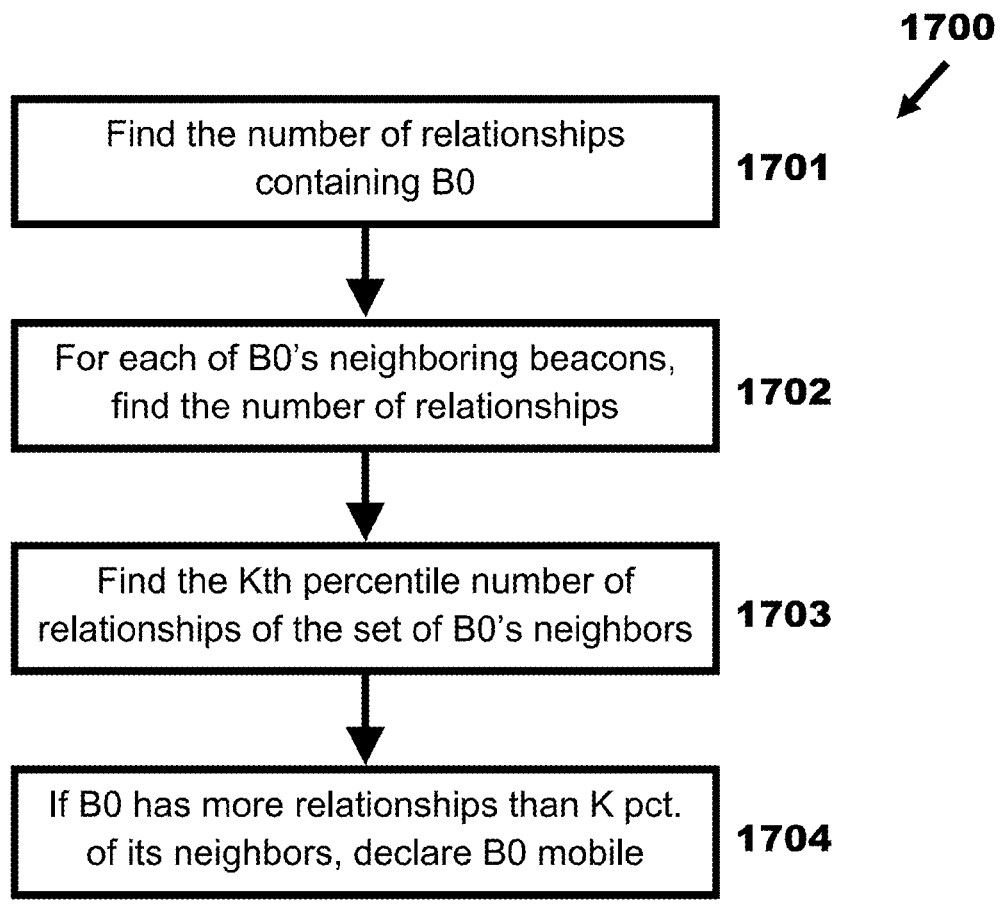
FIG. 17 shows another method of detecting a beacon exhibiting Mobility.

FIG. 17 shows another method 1700 of detecting beacon Mobility. First, the method finds the number of relationships containing beacon B0 (step 1701). Second, for each of beacon B0's neighbors, the number of relationships is found (step 1702). Then, using techniques familiar to those with ordinary skill in the art, the Kth percentile (e.g., K=99) number of relationships over the set of beacon B0's neighbors is found (step 1703). In certain implementations, the value of K is determined, in part, by the expected number of mobile beacons as a fraction of the entire beacon population and the difference between the expected number of relationships for mobile and non-mobile beacons. Finally, if beacon B0's number of relationships exceeds the Kth percentile number of relationships among beacon B0's neighbors, then the method declares beacon B0 to be mobile (step 1704).

In general, mobile beacons have the opportunity to be observed with neighbors from a spatial area whose radius is significantly larger than a typical beacon transmission range. Thus, mobile beacons often form extremely large numbers of relationships that far exceed the numbers of relationships accumulated by their non-mobile neighbors.

Example 3

Figure 18:
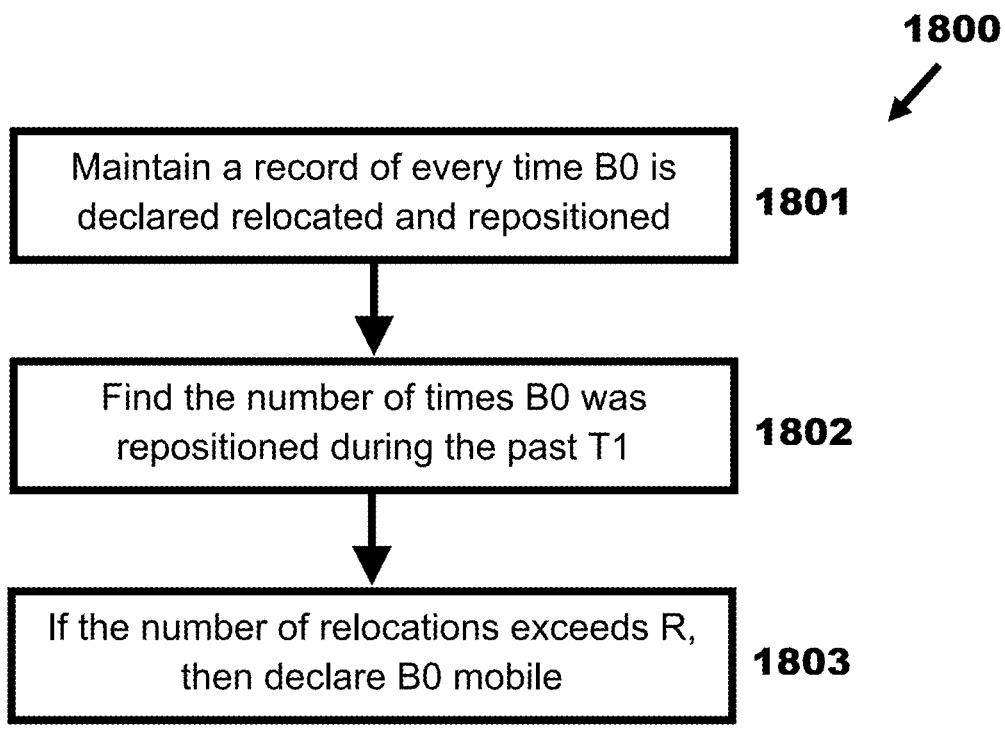
FIG. 18 shows a further method of detecting a beacon exhibiting Mobility.

FIG. 18 shows a further method of detecting beacon Mobility. First, the method maintains a record of every instance in which beacon B0 has been declared relocated and repositioned in the database (step 1801). Then, from those instances of relocation and repositioning, the number of relocation that have occurred within the past T1 time intervals (e.g., 365 days) is determined (step 1802). Finally, if the number of relocation and repositioning events exceeds threshold R (e.g., 5), then the method declares beacon B0 to be mobile (step 1803).

In certain implementations, the values of number T1 and threshold R are jointly determined, in part, by the frequency of beacon attribute updates in the system and the distinction between a frequently relocated beacon and a truly mobile beacon. A frequently relocated beacon will reside in a fixed location sufficiently long that the system will be able to detect the relocation, reposition the beacon and use it for reliable user positioning. However, a mobile beacon will continue to change its location faster than the system can react, and it will never provide reliable user positioning.

Example 4

Figure 19:
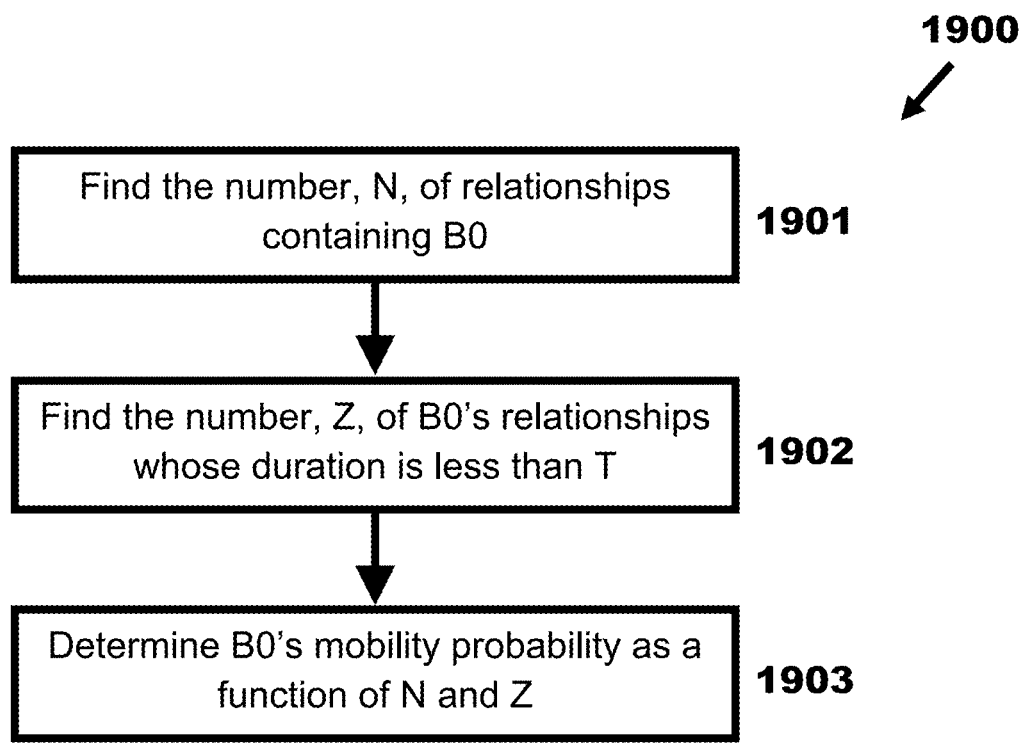
FIG. 19 shows yet another method of detecting a beacon exhibiting Mobility.

FIG. 19 shows yet another method 1900 of detecting beacon Mobility. First, the method finds the total number, N, of relationships containing beacon B0 (step 1901). Next, the method determines how many of beacon B0's relationships have duration (stored in the attributes of each relationship or determined based on the time difference between the first and last observations of the relationship) less than time T (e.g., 1 day) (step 1902). In certain implementations, the value of time T is determined, in part, by the distributions of relationship durations typical of mobile and non-mobile beacons. Finally, find the probability that beacon B0 is mobile is determined (step 1903) by using a function of the following form:

$$P(M \mid N, Z) = \frac{P(N, Z \mid M) P(M)}{P(N, Z)}$$

Often, mobile beacons will have both a large number of total relationships and a large fraction of short duration relationships. In particular, mobile beacons that travel in an apparently random fashion (as opposed to a repeated route) will primarily accumulate short duration relationships due to the fact that they may only be in physical proximity to a large subset of their neighbors on only one occasion during the life of the beacon.

Ubiquity

As described above, certain embodiments declare beacons to be ubiquitous if they have identifiers that are duplicated by other beacons and/or possess other attributes that render them difficult or impossible to distinguish from one another. In other words, the beacons are determined to exhibit the pathology of Ubiquity.

Example 1

Figure 20:
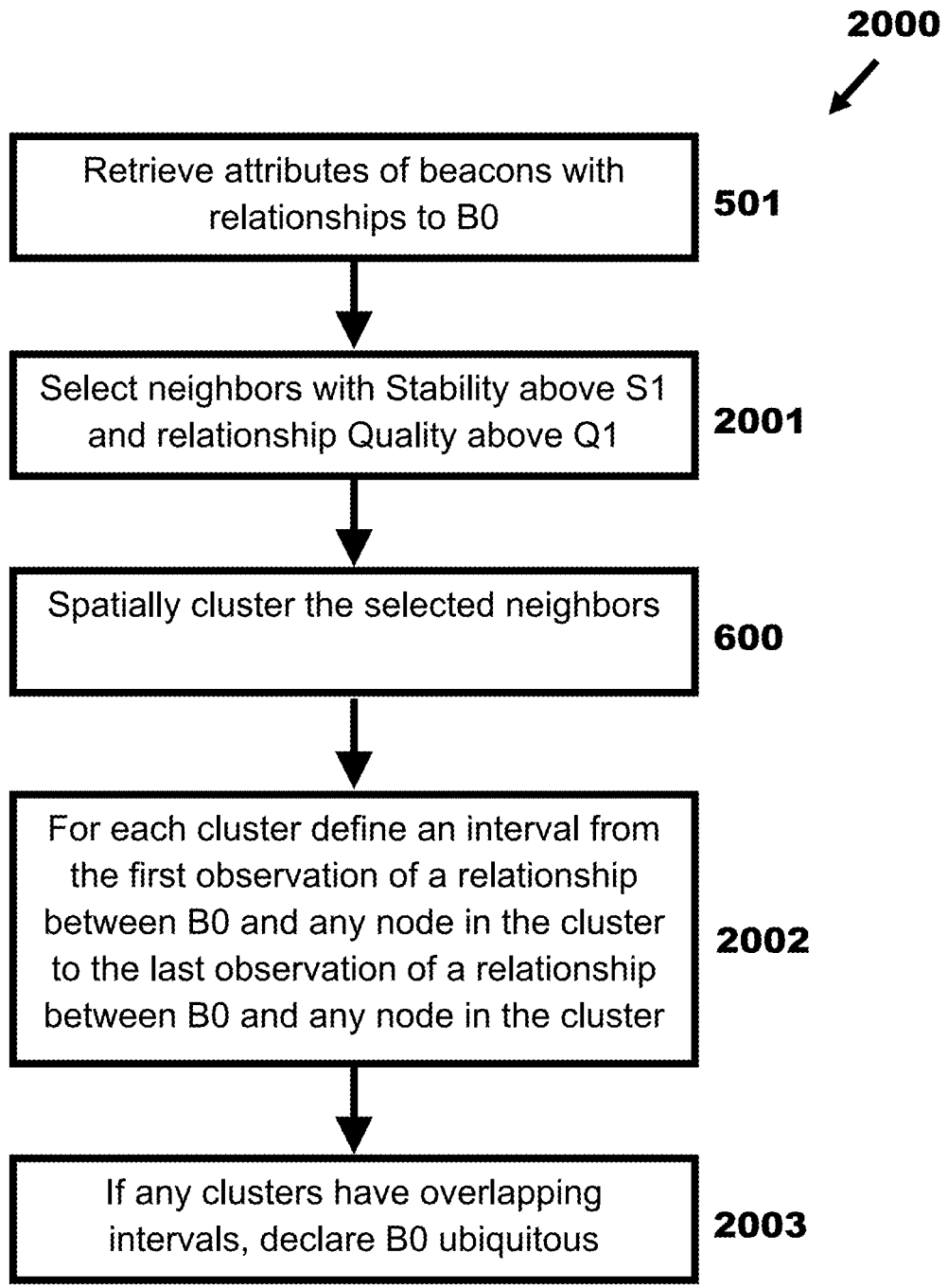
FIG. 20 shows a method of detecting a beacon exhibiting Ubiquity.

FIG. 20 shows a method 2000 of detecting a beacon exhibiting Ubiquity. First, the method retrieves the attributes of beacon B0's relationships and neighboring beacons (step 501). Then neighboring beacons whose Stability values are above some threshold S1 (as stored in the database of beacon attributes) and whose relationships to beacon B0 have Quality values above some threshold Q1 are selected (step 2001). In certain implementations, the values of threshold S1 and threshold Q1 will be determined, in part, by typical values of Stability and Quality in the system and various performance considerations.

Next, the method spatially clusters the set of selected neighbors using method 600, described above, and defines an observation interval for each cluster (step 2002). To define an observation interval, one implementation of the method 2000 sets the beginning of the interval as the time of the first observation of any relationship between beacon B0 and a member of the cluster, and, for the same cluster, sets the end of the interval as the time of the last observation of any relationship between beacon B0 and a member of the cluster. Overall, the times of every observation of beacon B0 with any member of the cluster should fall within the cluster's observation interval.

Finally, if the intervals for any two clusters overlap (the intersection of the intervals forms an interval of nonzero duration), then the method declares beacon B0 to be ubiquitous (step 2003). Given the fact that spatial clusters are separated by a distance greater than beacon B0's coverage radius, overlapping observation intervals indicate that beacon B0 was observed in multiple distinct locations during a single interval and therefore must be ubiquitous.

Example 2

Figure 21:
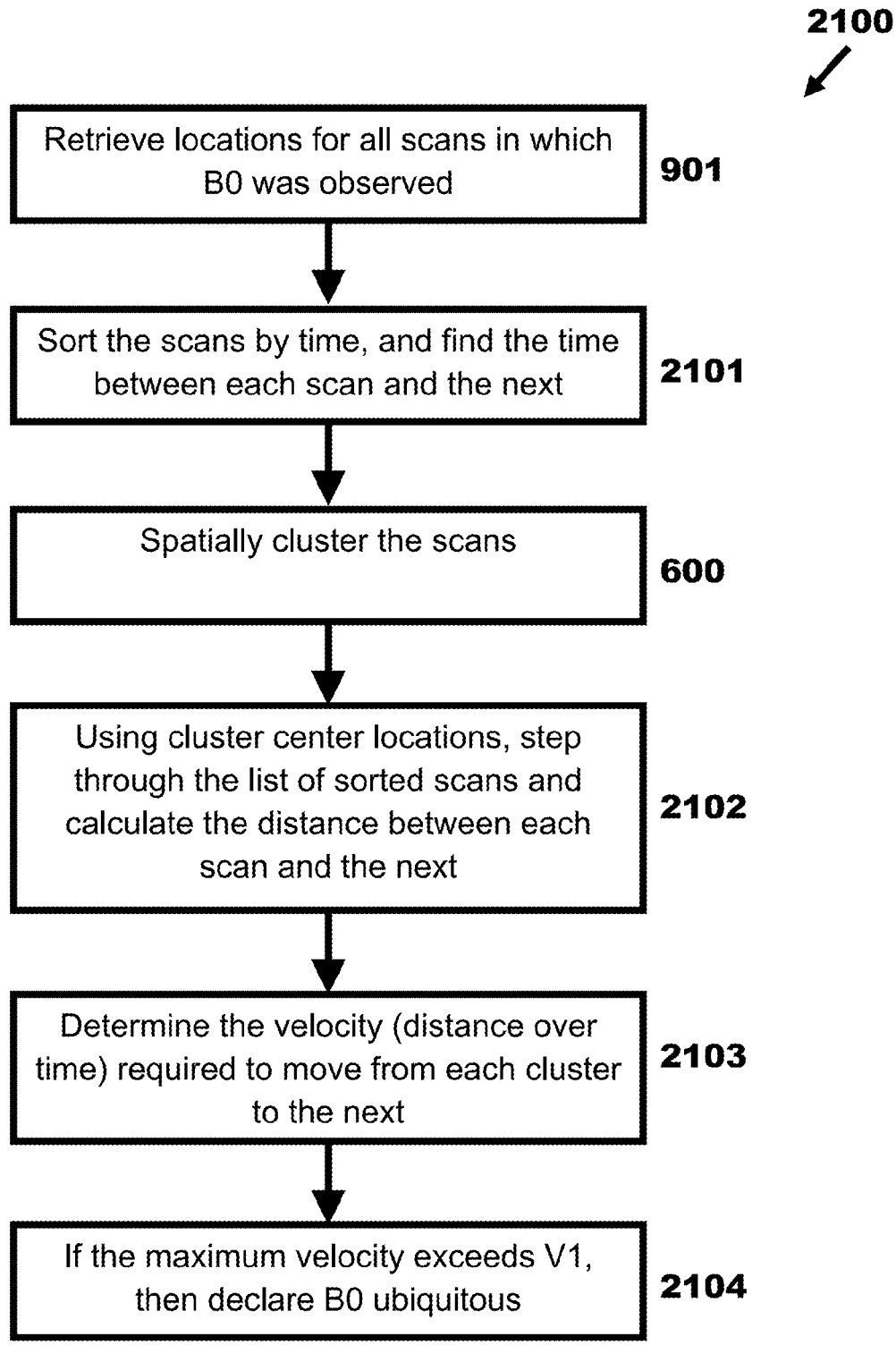
FIG. 21 shows another method of detecting a beacon exhibiting Ubiquity.

FIG. 21 shows another method 2100 of detecting a beacon exhibiting Ubiquity. First, the method begins by retrieving scans in which beacon B0 was observed and the scan attributes contain reliable scan locations (step 901). The reliability of a scan location is related to the source of location associated with the scan. For example, with a relatively clear view of the sky, a GPS-generated location will likely be more reliable than a location estimate from a Wi-Fi based positioning system, which, in turn, is likely more reliable than a cell tower-based position estimate. In general, each positioning technique can be associated with a generally accepted positioning error, which can be used to rank the techniques against each other in terms of reliability, with lower positioning errors having higher reliability measures. The scans could be from any device or devices that supplied reliable records of their locations (e.g., GPS). Next, scan times in the scan attribute data are sorted in ascending chronological order (oldest to newest) by the time at which the scans were collected, and the amount of time that passed between each scan and the next is found (step 2101). In this step, it is acceptable to have zero time difference between subsequent scans, though it may prove useful to replace zero time difference with a small constant in some implementations to prevent a divide by zero condition. Next, the method spatially clusters the selected scans according to method 600 described above.

Now that each scan belongs to a cluster, the method assigns each scan to the location of its cluster center such that scans from the same cluster are associated with the same location, and then finds the distance between each scan and the following scan in the ordered list of scans created in step 2101 (step 2102). Next, the velocity (distance divided by time) necessary to move from one scan to the next scan in the ordered list is determined (step 2103). Finally, if any pair of scans would require a velocity greater than V1 (e.g., 1600 km per hour), then the method declares beacon B0 to be ubiquitous (step 2104).

In certain implementations, the value of V1 is determined, in part, by the typical speeds at which a mobile beacon might travel from one location to another. Hence, if the velocity necessary to travel from one cluster of scans to another exceeds the reasonable speed of a mobile beacon, then beacon B0 exhibits Ubiquity by appearing in multiple locations effectively simultaneously.

Example 3

Figure 22:
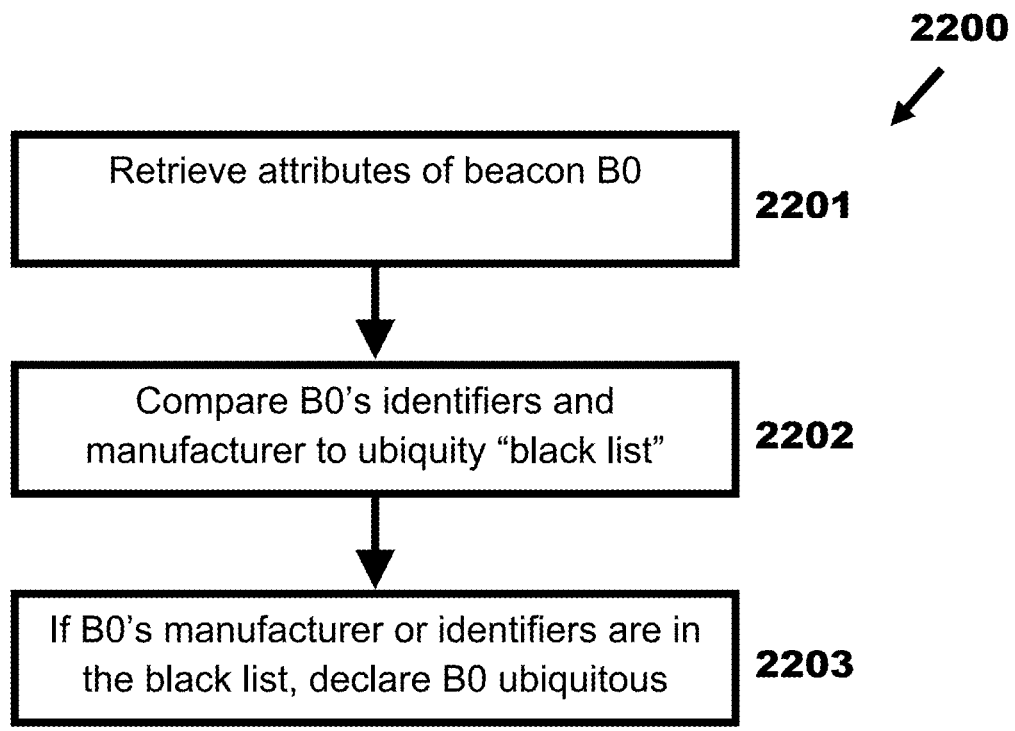
FIG. 22 shows a further method of detecting a beacon exhibiting Ubiquity.

FIG. 22 shows a further method 2200 of detecting a beacon exhibiting Ubiquity. First, the method retrieves the attributes of beacon B0 (step 2201). Then beacon B0's identifiers and manufacturer information is compared to a "black list" of known ubiquitous beacons and beacon manufacturers (step 2202). If beacon B0's identifiers and or manufacturer information appear on the black list, then the method declares beacon B0 to be ubiquitous (step 2203).

In many cases, beacon identifiers are assigned or governed by a standards body (e.g. IEEE assigns MAC address ranges for 802.11 beacons). Beacon identifiers that give evidence of noncompliance with standards have often been reconfigured without appropriate safeguards against duplication and can cause instances of Ubiquity. Further, certain manufacturers assign non-unique identifiers either randomly or systematically to their beacons (often in defiance of standards) and can be recognized through the analysis of market research and/or empirical data and added to a black list of ubiquitous beacon manufacturers.

Example 4

Figure 23:
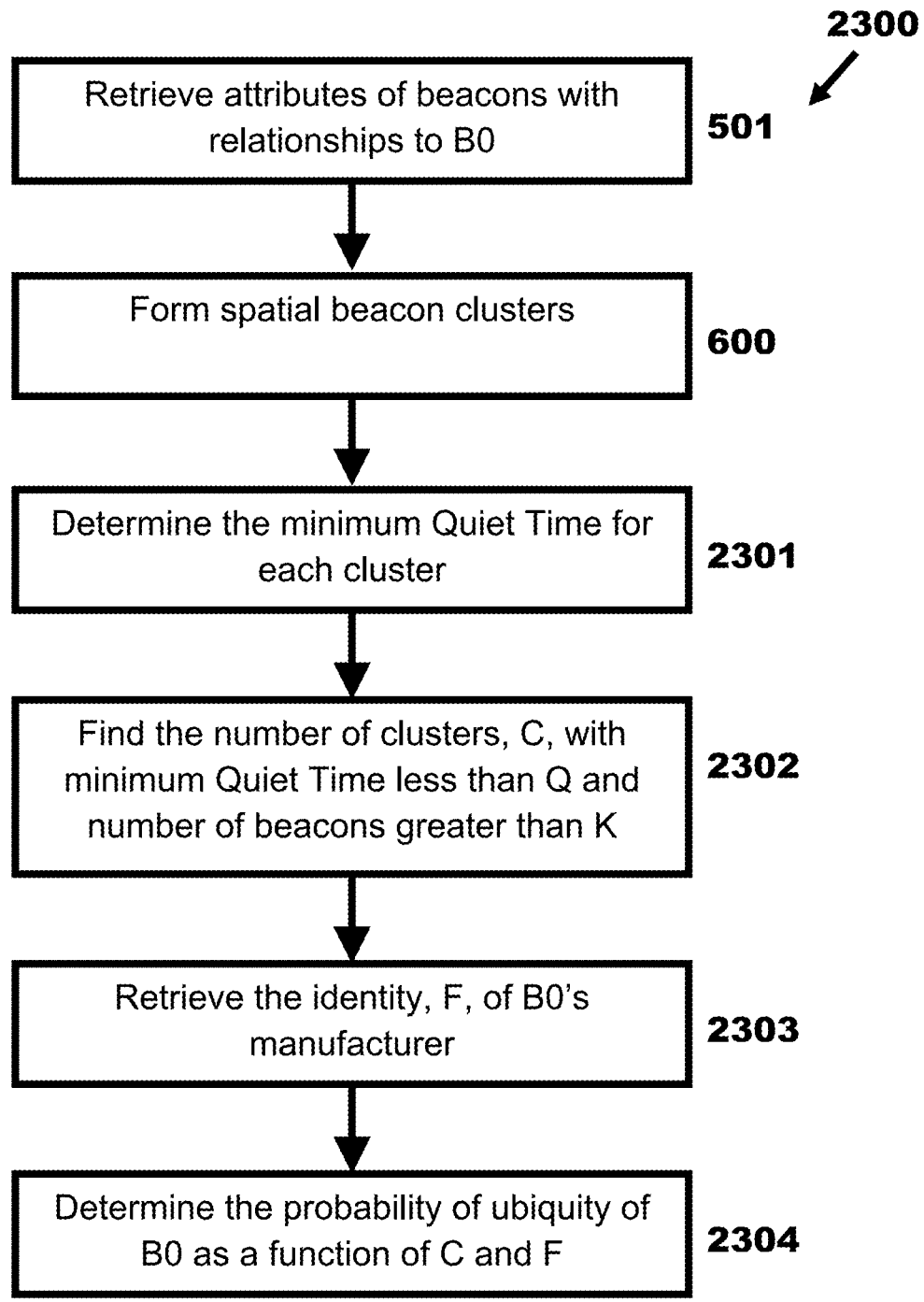
FIG. 23 shows still another method of detecting a beacon exhibiting Ubiquity.

FIG. 23 shows yet another method 2300 of detecting a beacon exhibiting Ubiquity. First, the method retrieves the attributes of beacon B0, its neighbors, and the relationships between beacon B0 and each neighbor (step 501). The method spatially clusters selected neighbors according to method 600 (and as shown in FIG. 13), described above, and finds the Quiet Time for each cluster by taking the minimum of the Quiet Time values for the relationships between beacon B0 and members of the cluster (step 2301).

Next, the number of clusters, C, which include more than threshold K (e.g., 5) beacons and whose Quiet Time is less than threshold Q (e.g., 7 days) are determined (step 2302). In certain implementations, the values of thresholds K and Q are determined, in part, by the empirical or theoretical probability distributions of cluster size and Quiet Time such that the number of clusters with size greater than threshold K and Quiet Time less than threshold Q provides a meaningful differentiator between ubiquitous and non-ubiquitous beacons. A sufficiently large threshold K reduces the probability that a given cluster will consist of a single family of beacons relocated as a group to beacon B0's location. A sufficiently small threshold Q insures that beacon B0 is in fact ubiquitous rather than mobile or relocated. However, an overly large threshold K or small threshold Q will cause the system to ignore informative clusters that could provide evidence of Ubiquity, so the selections of thresholds K and Q must be informed by empirical and/or theoretical understanding of beacon behavior and determined according to the performance requirements of the system.

Next, the method retrieves the identity of beacon B0's manufacturer, F (step 2303), and uses an equation of the following form to determine the probability, P(U|C, F), that beacon B0 is ubiquitous (step 2304):

$$P(U \mid C, F) = \frac{P(C, F \mid U) P(U)}{P(C, F)}$$

Even if a particular manufacturer does not produce exclusively ubiquitous or non-ubiquitous beacons, certain manufacturers may produce beacons with a greater or lesser probability of Ubiquity and change the probability of Ubiquity as a function of C, the number of selected clusters.

Excess Range

As described above, certain embodiments declare beacons to have Excess Range if it is observable over an area that significantly exceeds the coverage areas of typical beacons of the same type. In other words, the beacons are determined to exhibit the pathology of Excess Range.

Example 1

Figure 24:
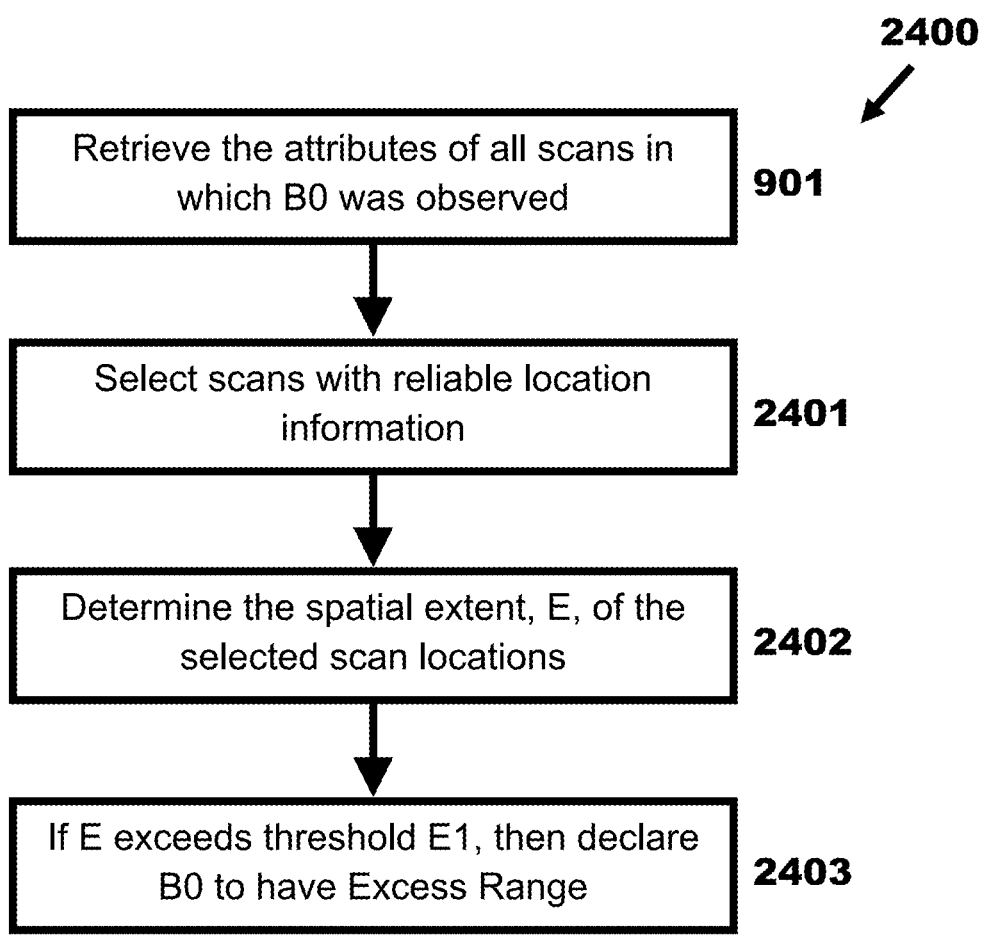
FIG. 24 shows a method of detecting a beacon exhibiting Excess Range.
Figure 25:
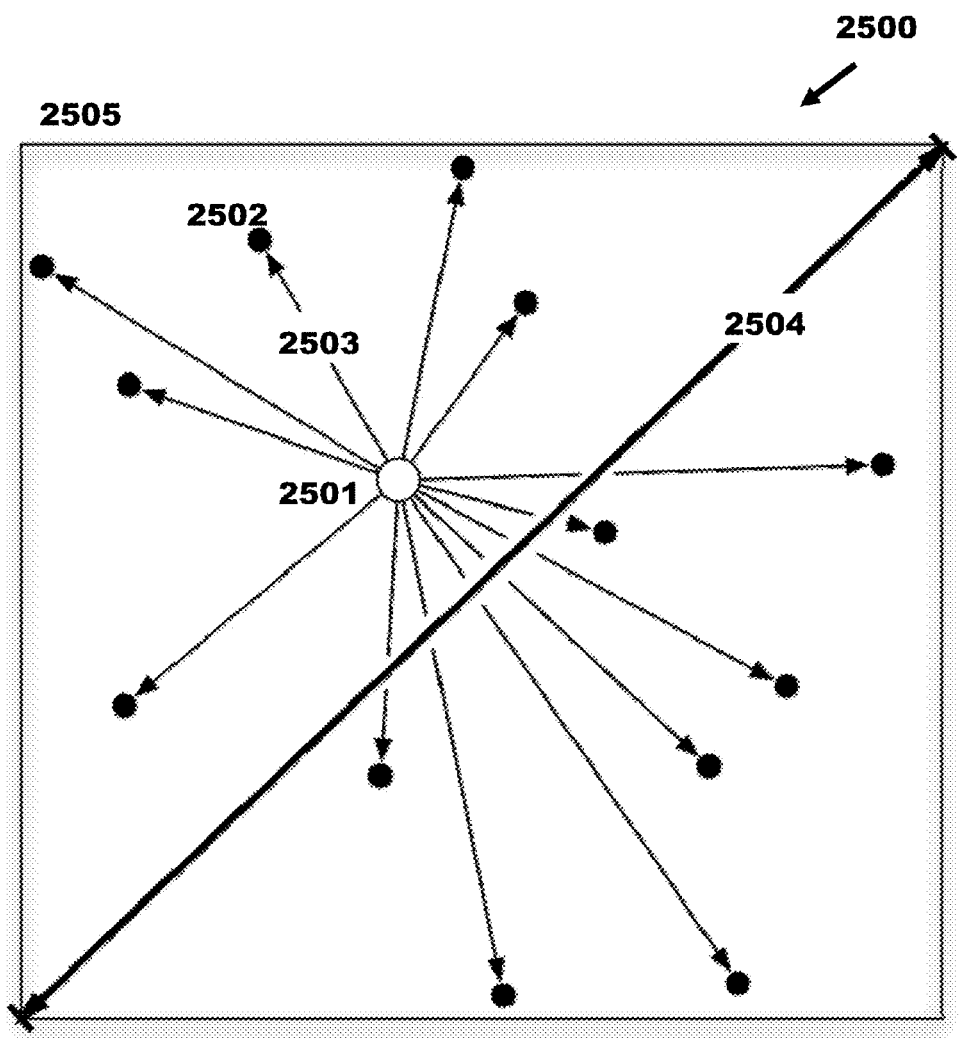
FIG. 25 illustrates a technique for determining the spatial extent of a set of scans.

FIG. 24 shows a method 2400 of detecting a beacon exhibiting Excess Range. FIG. 25 illustrates a technique for determining the spatial extent of a set of scans, which is useful in method 2400.

First, the method retrieves the attributes of scans in which beacon B0 was observed (step 901). Then those scans whose attributes contain location information from a reliable source (e.g., GPS) are selected (step 2401). Next, the spatial extent, E, of the selected scans are determined (step 2402) by finding the length of a diagonal (line 2504 of FIG. 25) of a smallest rectangle 2505 that contains selected scans 2502 of beacon B0 2501. Finally, if extent E exceeds some threshold E1, then the method declares beacon B0 to have Excess Range. In certain implementations, the value of threshold E1 is determined, in part, by the expected transmission range of a beacon of beacon B0's type. While the above example uses a rectangle to determine spatial extent, this is merely illustrative and other geometric figures are within the scope of the invention, e.g., circles, triangles, and/or other polygons.

Example 2

Figure 26:
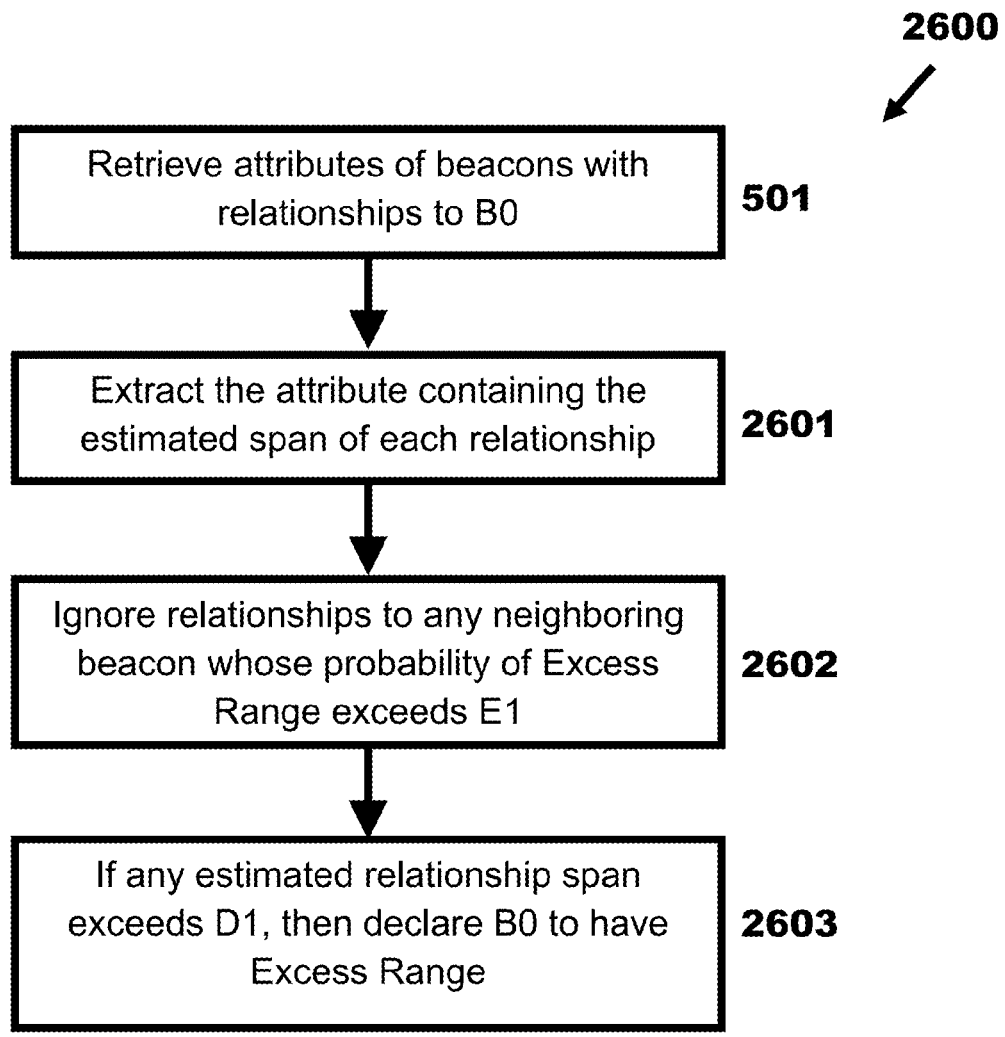
FIG. 26 shows another method of detecting a beacon exhibiting Excess Range.

FIG. 26 shows a method 2600 of detecting a beacon exhibiting Excess Range. First, the method retrieves the attributes of beacon B1, its neighbors, and the relationships between beacon B0 and its neighbors (step 501). Then, an Estimated Distance attribute for each relationship is extracted from the retrieved information or determined (step 2601).

In certain implementations, the Estimated Distance of a relationship is determined based on the locations and received signal strength values of the scans used to define the relationship. For instance, using signal pathloss models familiar to those having ordinary skill in the art, the system can estimate the distance from the scan location to the locations of beacons from which signals were received. Basic principles of planar geometry state that the shortest path between two points forms a straight line, so the scan with the minimum sum distance to a pair of beacons will be the scan closest to the straight line connecting the two beacons. Thus, subject to certain assumptions about the isotropy of scan locations and the number of scans, the scan with the minimum sum distance to a pair of beacons should lie on or about the line between those beacons, and the sum distance to the scan location should form a good estimator of the distance between the beacons—the Estimated Distance of the relationship.

Next, the method ignores relationships with neighboring beacons which themselves have a probability of Excess Range greater than some threshold E1 (step 2602). In certain implementations, the value of threshold E1 is determined, in part, by performance considerations related to the sensitivity of the user-positioning algorithm to beacons having Excess Range and the degree to which a beacon with Excess Range can distort the observed attributes of its neighbors. For example, if beacon B0 has a neighbor exhibiting Excess Range, then that neighbor can cause the mistaken impression that beacon B0 itself has Excess Range because the two beacons were seen together even though their estimated positions indicate that their separation should preclude the simultaneous observation of beacons with typical transmission range.

Finally, if any Estimated Distance of a relationship between beacon B0 and a selected neighbor exceeds threshold D1, then the method declares beacon B0 to have Excess Range (step 2603). In certain implementations, threshold D1 is determined, in part by the typical transmission ranges of beacon B0 and its neighbors.

Example 3

Figure 27:
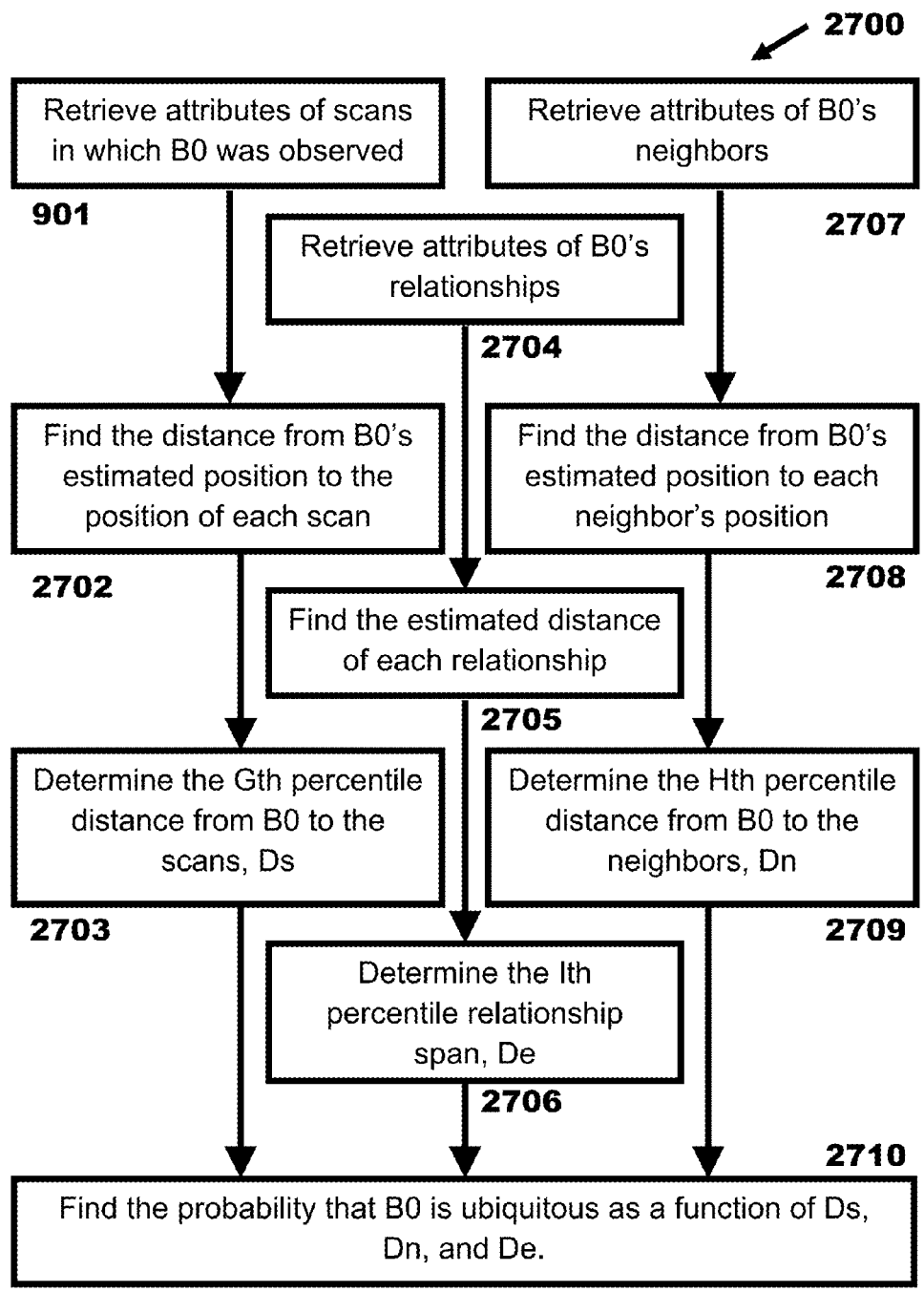
FIG. 27 shows a further method of detecting a beacon exhibiting Excess Range.

FIG. 27 shows a method 2700 of detecting a beacon exhibiting Excess Range. Reference is also made to FIG. 25 for illustrative purposes. First, the method retrieves the attributes of scans in which beacon B0 was observed and reliable location information is available (step 901). Second the method finds the distance (2503 from FIG. 25) from beacon B0's estimated position 2501 to the position of each selected scan 2502 (step 2702). Third, using techniques familiar to one with ordinary skill in the art, the Gth percentile (e.g., G=90) distance, Ds, from beacon B0's estimated position to the positions of the selected scans is found (step 2703). In certain implementations, the value of percentile G is determined, in part, by the quality of the location information available in the attributes of the scans. If it is likely that a certain percentage of the scans contain spurious location information, then decreasing percentile G allows a larger fraction of scans to be disregarded.

Next, the method retrieves the attributes of beacon B0's relationships (step 2704), and extracts the Estimated Distance, as described above, of each relationship (step 2705). Then the Ith percentile Estimated Distance, De, of the set of relationships is found (step 2706). In certain implementations, the value of percentile I is determined, in part, by the quality of the Estimated Distance values and the likelihood that some fraction of relationships would contain inaccurate values. Decreasing percentile I allows the system to disregard an increasing fraction of relationships having large Estimated Distance values.

Next, the attributes of beacon B0's neighboring beacons for which position information is available is retrieved (step 2707), and the distance between beacon B0's estimated position and the position of each neighbor is determined (step 2708). Then the method determines the Hth percentile distance, Dn, between beacon B0 and its neighbors (step 2709). In certain implementations, the value of percentile H is determined, in part, by the probability that some fraction of beacon B0's neighbors have incorrect positions.

Finally, the method uses an equation of the following form to determine the probability, P(L|Ds, Dn, De), that beacon B0 is ubiquitous:

$$P(L \mid D_s, D_n, D_e) = \frac{P(D_s, D_n, D_e \mid L)P(L)}{P(D_s, D_n, D_e)}$$

Stability Functions

Certain embodiments aggregate individual pathology probabilities to form an overall stability metric. In general the aggregation function takes the following form:

$$S = f(\{P_j\})$$

In the equation above, S is the stability value, and function $f$ takes in the set of pathology probabilities, where Pj is the probability of pathology j.

Stability Examples

The following functions are illustrative examples of how to aggregate the various pathology probabilities into a single stability value, S.

In the first example, stability ranges between 0 and 1 and is negatively related to the probability of the most probable pathology (see equation below). Thus, larger S would indicate greater stability and lower overall probability of pathology, and smaller S indicates less stability and a greater overall probability of pathology.

$$S = 1 - \max_j(P_j)$$

In the second example, each separate pathology probability, Pj, is tested against a probability threshold, tj, to decide whether the beacon exhibits the particular pathology with sufficient probability (see equation below). The indicator function, I(X), takes value 1 if its argument is true and 0 if its argument is false. Thus, if any pathology probability exceeds its threshold, then S=0. Otherwise, S=1.

$$S = 1 - \max_j(I(P_j > t_j))$$

In the third example, each pathology has a corresponding weight, wj, related to its relative significance in determining overall stability (see equations below). For instance, in situations in which mobile beacons have a higher probability of causing large client positioning errors than Excess Range beacons, the probability of Mobility would receive a higher weight than the probability Excess Range.

$$S = 1 - \sum_j w_j P_j$$

$$\sum_j w_j = 1$$

Stability Applications and Extensions

Stability, as determined herein, is a valuable metric for evaluating overall beacon reliability both for client position estimation and for the estimation and refinement of the positions of other beacons. Specifically, in certain implementations, stability is used in client positioning, database pruning, database expansion, and stability propagation.

In client positioning, stability metrics are used to generate relative weights to emphasize or deemphasize the contributions of individual beacons to the overall position estimate. Similarly, stability is used to emphasize or deemphasize the contributions of beacons used to position other beacons. In either case, the overall stability of the beacons used for location estimation are used to quantify the quality of the resulting estimate. That is, if the beacons used for positioning are extremely stable, then the estimated location should have a correspondingly high reliability.

In database pruning, stability values are used to choose beacons for exclusion from the database. Stability values are also used to exclude scans, relationships, or submissions that appear incorrect or spurious because they contradict the attributes of an otherwise stable beacon. Database pruning, while not generally necessary, offers a means for saving storage space and processing power in a large-scale positioning system.

Stability metrics are used in database expansion either as confidence factors for stable bootstrapping or as indicators of the quality of beacons in a particular class. Database expansion through bootstrapping involves positioning beacons based on other beacons. Thus, if the beacons used for positioning are unreliable, it can lead to "viral effects" that degrade the overall quality of the system by propagating unreliable beacon positions. Stability provides a means for ensuring that beacons used for positioning other beacons are sufficiently reliable.

Indicators of beacon class quality are important to database growth and maintenance because they can indicate the need for measures such as the dedicated scanning of an area or communication with a beacon-operating entity in order to acquire new or corrected beacon data. For instance, if a given geographical area exhibits unacceptably low stability, then it may be necessary to dispatch dedicated scanning devices to survey the area and provide updated scans. Alternatively, if a set of beacons belonging to a particular entity has begun to exhibit unacceptably low stability, then the entity could be contacted to request new submissions of beacon information.

Finally, since the stability of a given beacon is often dependent on the stability of neighboring beacons, updating the stability values of a beacon or set of beacons allows the propagation of updated stability values to other beacons in the network.

Specifically, in some implementations, in a beacon graph, stability is propagated from one beacon to another over the edges formed by relationships. That is, the stability of a given beacon is reevaluated using the respective stabilities of the other beacons to which it is related and the attributes of the relationships connecting them.

For example, if the attributes of a relationship indicate that two beacons are close together with extremely high probability, and one of the beacons exhibits an extremely high stability, then the related beacon should also be considered highly stable. Conversely, if a beacon's estimated position and other attributes are derived from an ensemble of relatively unstable neighbors, then the beacon itself should be considered unstable.

Further, whenever a single beacon either enters the graph or has its attributes updated, related beacons can update their own attributes in response, and the updates can propagate through the entire beacon graph at a rate determined by computational and other implementation considerations. One common technique for efficiently propagating updates through a graph is to iteratively choose random sets of nodes to update and continuing to iterate until a desired level of convergence is achieved.

Empirical Probabilities and Thresholding

In the examples provided above, certain probability functions and/or threshold values can be derived from empirical data. The following description provides techniques for determining these values as used in certain embodiments of the invention. The use of other techniques known to one having ordinary skill in the art are also within the scope of the invention.

In order to derive the empirical probability, P(a), of a given feature or event, a, it is necessary to first assemble a representative set of training data in which some samples (subset A) are known to exhibit the particular feature and the remainder (subset B) are known to not exhibit the feature. Thus, the probability of a given sample exhibiting the feature is given by the size of subset A divided by the sum of the sizes of subsets A and B.

$$P(a) = \frac{|A|}{|A| + |B|}$$

The probability expression can be further refined by finding the conditional probabilities of the feature given an observable, x. Specifically, given a sample that exhibits observable x, the probability of feature a can be found by dividing the number of samples in set A that exhibit observable x, Ax, by the sum of the numbers of samples in both A and B that exhibit x. In some circumstances, it may be more practical to compute the equivalent expression in terms of the probability of observable x given feature a, also given below.

$$P(a|x) = \frac{|A_x|}{|A_x|+|B_x|} = \frac{P(x|a)P(a)}{P(x)}$$

Finally, to place a limit on the probability that a given sample exhibits feature a, an empirical threshold on the value of observable x can be derived. For example, if P(a|x) is non-decreasing with x, then we can find threshold x' such that P(a|x<x')<p'. The value of x' can be determined by testing the empirical values of P(a|x') directly for a range of x' or by deriving an analytical function to describe the relationship between P(a|x) and x.

The techniques and systems disclosed herein may be implemented as a computer program product for use with a computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Moreover, the techniques and systems disclosed herein can be used with a variety of mobile devices. For example, mobile telephones, smart phones, personal digital assistants, satellite positioning units (e.g., GPS devices), and/or mobile computing devices capable of receiving the signals discussed herein can be used in implementations of the invention. The location estimate, expected error of the position estimate, and/or the probability values can be displayed on the mobile device and/or transmitted to other devices and/or computer systems. Further, it will be appreciated that the scope of the present invention is not limited to the above-described embodiments, but rather is defined by the appended claims; and that these claims will encompass modifications of and improvements to what has been described.

What is claimed is:

1. A method of determining a measure of likelihood that a designated wireless device exhibits at least one pathological characteristic, the pathological characteristic causing errors in position estimation to occur when the designated wireless device is used as a landmark in a position estimation system if left uncorrected, the method comprising:

based on information from signals received from a designated wireless device, retrieving at least one of (i) an identifier representing a manufacturer of the designated wireless devices and (ii) an identifier representing a model type of the designated wireless device; and determining a measure of likelihood that the designated wireless device exhibits at least one pathological characteristic based on at least one of (i) the identifier representing a manufacturer of the designated wireless devices and (ii) the identifier representing a model type of the designated wireless device.

2. The method of claim 1, the measure of likelihood being a binary decision.

3. The method of claim 1, the measure of likelihood being a relative measure of a probability that the designated wireless device exhibits the at least one pathological characteristic.

4. The method of claim 1, further comprising determining a measure of likelihood that a wireless device other than the designated wireless device exhibits at least one pathological characteristic based on the other wireless device having a relationship with the designated wireless device, the existence of the relationship being based on the designated wireless device and the other wireless device being within signal reception range of a same position within a given period of time.

5. The method of claim 1, the designated wireless device having a first identifier and the method further comprising determining a second measure of likelihood that a second designated wireless device exhibits at least one pathological characteristic based on a comparison of the first identifier and a second identifier associated with the second designated wireless device.

6. The method of claim 1, the at least one pathological characteristic including the designated wireless device being a mobile device which lacks a fixed geographic position.

7. The method of claim 1, the at least one pathological characteristic including the designated wireless device exhibiting signal transmission characteristics that are atypical of a wireless device of a type matching the designated wireless device.

8. The method of claim 1, the at least one pathological characteristic including that the location information associated with the designated wireless device is not an accurate present location of the wireless device.

9. The method of claim 1, the at least one pathological characteristic including that an identifier associated with the designated wireless devices is also associated with at least one other wireless device.

10. The method of claim 1, the designated wireless device having an identifier and the method further comprising associating, in a reference database, the identifier with an indication of the measure of likelihood.

11. The method of claim 1, the designated wireless device being a WiFi-enabled access point.

12. The method of claim 1, the designated wireless device being a mobile telephone transceiver installation.

13. A system for determining a measure of likelihood that a designated wireless device exhibits at least one pathological characteristic, the pathological characteristic causing errors in position estimation to occur when the designated wireless device is used as a landmark in a position estimation system if left uncorrected, the system comprising:
- a non-transitory computer readable media including instructions that when executed by a computer system cause the computer system to:
  - based on information from signals received from a designated wireless device, retrieve at least one of (i) an identifier representing a manufacturer of the designated wireless devices and (ii) an identifier representing a model type of the designated wireless device; and
  - determine a measure of likelihood that the designated wireless device exhibits at least one pathological characteristic based on at least one of (i) the identifier representing a manufacturer of the designated wireless devices and (ii) the identifier representing a model type of the designated wireless device.

14. The system of claim 13, the measure of likelihood being a binary decision.

15. The system of claim 13, the measure of likelihood being a relative measure of a probability that the designated wireless device exhibits the at least one pathological characteristic.

16. The system of claim 13, the non-transitory computer readable media further including instructions that when executed by a computer system cause the computer system to determine a measure of likelihood that a wireless device other than the designated wireless device exhibits at least one pathological characteristic based on the other wireless device having a relationship with the designated wireless device, the existence of the relationship being based on the designated wireless device and the other wireless device being within signal reception range of a same position within a given period of time.

17. The system of claim 13, the designated wireless device having a first identifier and the non-transitory computer readable media further including instructions that when executed by a computer system cause the computer system to determine a second measure of likelihood that a second designated wireless device exhibits at least one pathological characteristic based on a comparison of the first identifier and a second identifier associated with the second designated wireless device.

18. The system of claim 13, the at least one pathological characteristic including the designated wireless device being a mobile device which lacks a fixed geographic position.

19. The system of claim 13, the at least one pathological characteristic including the designated wireless device exhibiting signal transmission characteristics that are atypical of a wireless device of a type matching the designated wireless device.

20. The system of claim 13, the at least one pathological characteristic including that the location information associated with the designated wireless device is not an accurate present location of the wireless device.

21. The system of claim 13, the at least one pathological characteristic including that an identifier associated with the designated wireless devices is also associated with at least one other wireless device.

22. The system of claim 13, the designated wireless device having an identifier and the non-transitory computer readable media further including instructions that when executed by a computer system cause the computer system to associate, in a reference database, the identifier with an indication of the measure of likelihood.

23. The system of claim 13, the designated wireless device being a WiFi-enabled access point.

24. The system of claim 13, the designated wireless device being a mobile telephone transceiver installation.

* * * * *

UNITED STATES PATENT AND TRADEMARK OFFICE
CERTIFICATE OF CORRECTION

| | | |
|---|---|---|
| PATENT NO. | : 8,971,923 B2 | Page 1 of 1 |
| APPLICATION NO. | : 14/052113 | |
| DATED | : March 3, 2015 | |
| INVENTOR(S) | : Farshid Alizadeh-Shabdiz et al. | |

It is certified that error appears in the above-identified patent and that said Letters Patent is hereby corrected as shown below:

In the Specification:
Col. 18, line 36 should read as follows:
803). In other words, J0 is closely related to the probability Col. 18, line 39 should read as follows:
equal to J0 directly, though other applications may require Signed and Sealed this
Thirtieth Day of June, 2015

Michelle K. Lee
*Director of the United States Patent and Trademark Office*